(12) United States Patent
Brocklebank

(10) Patent No.: US 7,634,423 B2
(45) Date of Patent: Dec. 15, 2009

(54) COMPUTER-IMPLEMENTED SYSTEM AND METHOD FOR WEB ACTIVITY ASSESSMENT

(75) Inventor: John C. Brocklebank, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 845 days.

(21) Appl. No.: 10/232,153

(22) Filed: Aug. 30, 2002

(65) Prior Publication Data

US 2003/0187719 A1 Oct. 2, 2003

Related U.S. Application Data

(60) Provisional application No. 60/368,889, filed on Mar. 29, 2002.

(51) Int. Cl.
*G06F 17/18* (2006.01)
(52) U.S. Cl. .......................... 705/10; 707/100
(58) Field of Classification Search ................ 705/10
See application file for complete search history.

(56) References Cited

U.S. PATENT DOCUMENTS

| | | | |
|---|---|---|---|
| 5,335,346 A | | 8/1994 | Fabbio |
| 5,941,947 A | | 8/1999 | Brown et al. |
| 6,286,005 B1 * | | 9/2001 | Cannon ...................... 707/100 |
| 6,292,798 B1 | | 9/2001 | Dockter et al. |
| 6,374,292 B1 | | 4/2002 | Srivastava et al. |
| 6,470,079 B1 * | | 10/2002 | Benson .................. 379/114.13 |
| 6,530,081 B1 | | 3/2003 | Hayes, Jr. |
| 6,928,398 B1 | | 8/2005 | Fang et al. |
| 7,010,495 B1 * | | 3/2006 | Samra et al. .................. 705/10 |
| 7,136,871 B2 * | | 11/2006 | Ozer et al. ............... 707/104.1 |
| 7,171,411 B1 | | 1/2007 | Lewis et al. |
| 7,254,547 B1 * | | 8/2007 | Beck et al. ..................... 705/14 |
| 7,533,038 B2 * | | 5/2009 | Blume et al. .................. 705/10 |
| 2002/0099952 A1 | | 7/2002 | Lambert et al. |
| 2003/0110246 A1 | | 6/2003 | Byrne et al. |
| 2003/0174178 A1 | | 9/2003 | Hodges |
| 2004/0148409 A1 | | 7/2004 | Davis et al. |
| 2004/0230829 A1 | | 11/2004 | Dogan et al. |

(Continued)

FOREIGN PATENT DOCUMENTS

WO  WO 0157706 A2 *  8/2001

OTHER PUBLICATIONS

Cheung, Outward bound, Should organisations be tempted by the option of outsourcing their CRM applications?, Information Age, Jul. 13, 2001, http://www.information-age.com/article/2001/july/outward_bound (last visited Mar. 15, 2007).*

(Continued)

*Primary Examiner*—Beth V Boswell
*Assistant Examiner*—Justin M Pats
(74) *Attorney, Agent, or Firm*—Jones Day

(57) ABSTRACT

A computer-implemented system and method for evaluating customer activity. Data about the customer activity is received and is used to generate actual data values associated with preselected business metrics. One or more business metric score cards may be generated to assess how the business metrics are performing as well as what business metrics can be changed to better meet business goals.

20 Claims, 23 Drawing Sheets

U.S. PATENT DOCUMENTS

| | | | |
|---|---|---|---|
| 2004/0254934 A1 | 12/2004 | Ho et al. | |
| 2005/0154885 A1 | 7/2005 | Viscomi et al. | |
| 2007/0240106 A1 | 10/2007 | Manson et al. | |

OTHER PUBLICATIONS

Dawar, Extensions of Broad Brands: The Role of Retreival in Evaluations of Fit, Journal of Consumer Psychology, 5(2), 189-207.*

Chen and Wells, Attitude toward the Site, Journal of Advertising Research, Sep. • Oct. 1999 (p. 27-37).*

Chung and Kaiser, Determinants of Temporal variations in Generic Advertising Effectiveness, Agribusiness, vol. 16, No. 2, 197-214 (2000).*

Aaker et al., On Using Response Latency to Measure Preference, J. Marketing Research, vol. XVII (May 1980), p. 237-44.*

Pham and Vanhuelle, Analyzing the Memory Impact of Advertising Fragments, Marketing Letters 8:4 (1997): p. 407-17.*

Wilkins et al., Economic Analysis of Tobacco Demand, World Bank Economics of Tobacco Toolkit, Tool 3. Demand Analysis, 2001.*

Hu et al., The State Antismoking Campaign and the Industry Response: The Effects of Advertising on Cigarette Consumption in California, The American Economic Review, vol. 85, No. 2, Papers and Proceedings of the Hundredth and Seventh Annual Meeting of the American Economic Association Washington, DC, Jan. 6-8, 1995, (May 1995), pp. 85-90.*

Vakratsas and Ambler, How Advertising Works: What Do We Really Know?, Journal of Marketing, Jan. 1999, p. 26-43.*

Lee and Brown, Lag Structures in Commodity Advertising Research, Agribusiness, vol. 8, No. 2, Mar. 1992, p. 143-54.*

Corkindale and Newall, Advertising Thresholds and Wearout, European Journal of Marketing, vol. 12, No. 5, 1978, p. 329-350, 359-373.*

Venkateswaran et al., Modeling Advertising Carryover in Fluid Milk: Comparison of Alternative Lag Specifications, Agricultural and Resource Economics Review, vol. 22, No. 1, Apr. 1993, p. 10-19.*

Tellis and Weiss, Does TV Advertising Really Affect Sales? The Role of Measures, Models, and Data Aggregation, Journal of Advertising, vol. 24, No. 3, Fall 1995, p. 1-12.*

Clarke, Econometric Measurement of the Duration of Advertising Effect on Sales, Journal of Marketing Research, vol. 13, Nov. 1976, p. 345-57.*

Cannon and Riordan, Effective Reach and Frequency: Does It Really Make Sense?, Journal of Advertising Research, Mar./Apr. 1994, p. 19-28.*

Liu and Forker, Generic Fluid Milk Advertising, Demand, Expansion, and Supply Response: The Case of New York City, Amer. J. Agr. Econ. May 1988, p. 229-36.*

Krishnamuthi et al., Intervention Analysis of a Field Experiment to Assess the Buildup Effect of Advertising, Journal of Marketing Research, vol. 23, Nov. 1986, p. 337-46.*

Pritchett et al., Optimal Choice of Generic Milk Advertising Expenditures by Media Outlet, Journal of Agricultural and Resource Economics, vol. 23, No. 1, 1988, p. 155-69.*

Bass and Clarke, Tested Distributed Lag Models of Advertising Effect, Journal of Marketing Research, vol. 9, Aug. 1972, p. 298-309.*

Simon and Arndt, The Shape of the Advertising Response Function, Journal of Advertising Research, vol. 20, No. 4, Aug. 1980, p. 11-28.*

Blair, An Empirical Investigation of Advertising Wearin and Wearout, Journal of Advertising Research, Dec. 1987/Jan. 1988, p. 45-51.*

Christensen, Efficient Use of Food Resources in the United States, United States Department of Agriculture, Technical Bulletin No. 963, Oct. 1948, p. 43-45.*

SAS/ETS Software [hereinafter SAS], as evidenced by User's Guide to SAS/ETS Software, SAS Institute Inc., 1999, p. 1-41, http://www.uc.edu/sashtml/ets/index.htm.*

Brockwell and Davis, Introduction to Time Series and Forecasting, Spring Science+Business Media, Inc., 2002, p. 112-116.*

Dawar, Extensions of Broad Brands: The Role of Retreival in Evaluations of Fit, Journal of Consumer Psychology, 5(2), 189-207, (1996).*

Bradlow and Fitzsimons, Subscale Distance and Item Clustering Effects in Surveys: A New Metric, Journal of Marketing Research, vol. 38, No. 2, May 2001.*

Dholakis and Rego, What makes commercial Web pages popular? An empirical investigation of Web page effectiveness, European Journal of Marketing 32, 7/8, 1998, pp. 724-36.*

\* cited by examiner

| Target Variable | Input Variable | R Square |
|---|---|---|
| Consumer Sample Info pages | cable q35 plus grp | 0.80 |
| Consumer Sample Info pages | cable q35 plus imp000 | 0.80 |
| tot pages | sports q35 plus grp | 0.79 |
| tot pages | sports q35 plus imp000 | 0.79 |
| tot pages | prime q35 plus grp | 0.79 |
| tot pages | prime q35 plus imp000 | 0.79 |
| tot pages | other q35 plus grp | 0.79 |
| tot pages | other q35 plus imp000 | 0.78 |
| tot pages | news q35 plus grp | 0.78 |
| tot pages | news q35 plus imp000 | 0.78 |
| Consumer Sample Info pages | prime q35 plus grp | 0.77 |
| Consumer Sample Info pages | prime q35 plus imp000 | 0.77 |
| Consumer SHIM pages | cable q35 plus grp | 0.77 |
| Consumer SHIM pages | cable q35 plus imp000 | 0.77 |
| Consumer SHIM pages | prime q35 plus grp | 0.76 |
| Consumer SHIM pages | prime q35 plus imp000 | 0.76 |
| Consumer Sample Info pages | synd q35 plus grp | 0.76 |
| Consumer Sample Info pages | synd q35 plus imp000 | 0.76 |

COMPUTER-IMPLEMENTED SYSTEM AND METHOD FOR WEB ACTIVITY ASSESSMENT

RELATED APPLICATIONS

This patent application claims priority of U.S. provisional patent application Ser. No. 60/368,889, filed Mar. 29, 2002, which is incorporated by reference.

FIELD OF THE INVENTION

The present invention relates generally to computer-implemented statistical analysis programs and more particularly to statistical analysis programs that analyze web activity.

BACKGROUND AND SUMMARY

Companies are increasingly taking notice of how their customers are utilizing their company web sites. Companies would like to leverage knowledge of customer web activity to see what impact the activity has upon company business goals. However, companies face difficulty in gaining sophisticated knowledge about customer web activity due to the enormity and real-time nature of the web activity. The difficulty further increases when web activity information is to be analyzed and interrelated with non-internet activities, such as company advertisement campaigns or point of sale activities. The information from each source must be painstakingly sifted through in order to see how each activity affects each other and how they individually and in the aggregate affect the company's underlying business goals.

The present invention overcomes the aforementioned difficulties by providing a computer-implemented system and method for evaluating customer activity. Data about the customer activity is received and is used to generate actual data values associated with preselected business metrics. One or more business metric score cards may be generated to assess how business metrics are performing as well as what business metrics can be changed to better meet business goals.

BRIEF DESCRIPTION OF THE DRAWINGS

FIG. 16 is a graphical user interface depicting an exemplary campaign analysis report;

DETAILED DESCRIPTION

Figure 1:
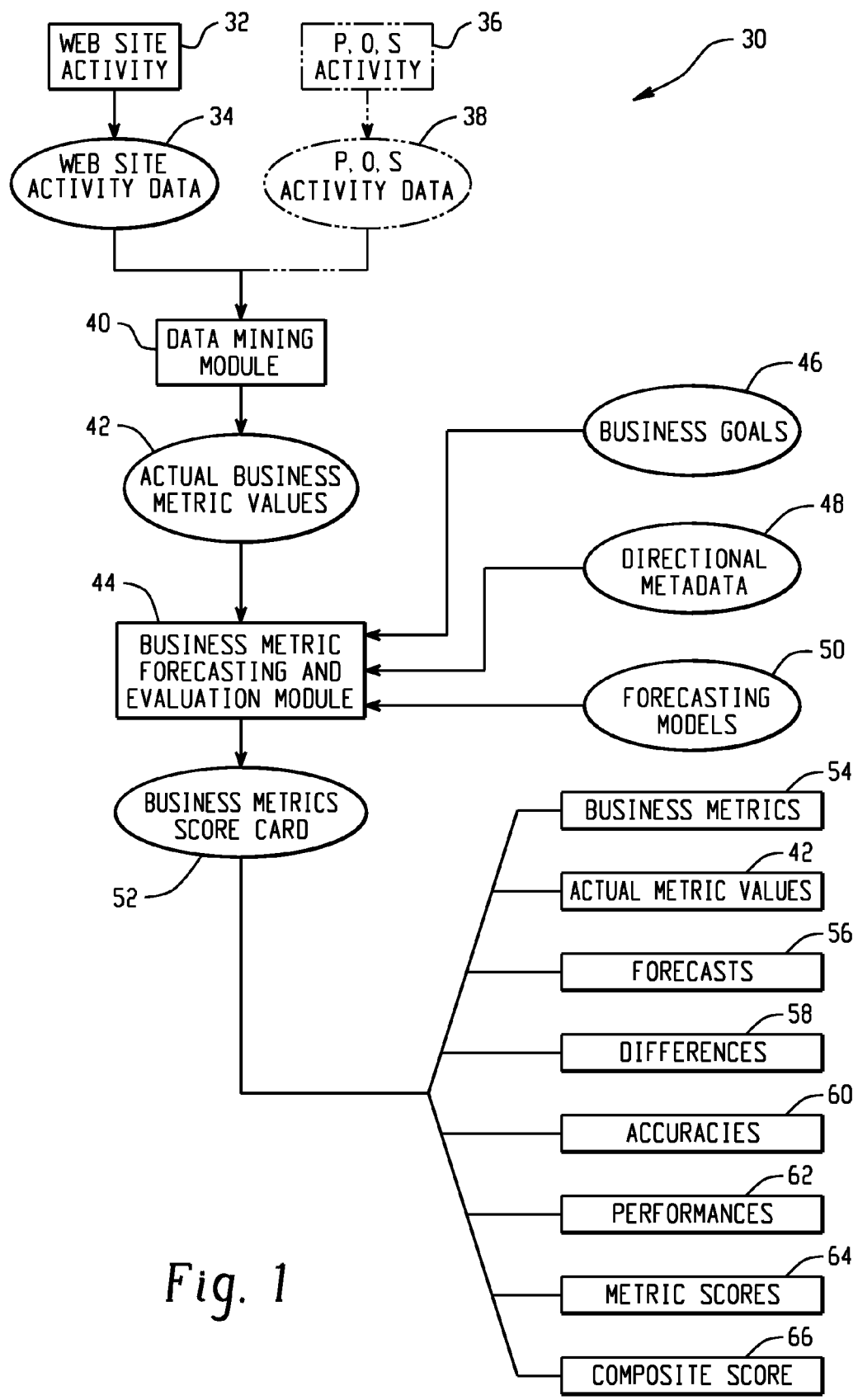
FIG. 1 is a block diagram depicting software and computer components utilized in generating a business metrics score card.

FIG. 1 depicts a computer-implemented system 30 that assesses how well or poorly a company is meeting its business goals 46. The system 30 analyzes customer activity data 32 in order to generate a business metrics score card 52. The score card 52 specifies which business metrics associated with the activity data are performing well or poorly with respect to the business goals 46. The business metrics on the score card 52 represent areas of interest and concern to the company, such as, improving operating efficiency, improving web site design, improving returns, anticipating growth, exploiting third party relationships, and customer satisfaction. This determination is done on both an individual business metric level as well as an overall level.

The score card 52 is an efficient way to integrate, distribute, and analyze performance information enterprise-wide to help make the right decisions. The system 30 helps business users analyze customer activity data in new and different ways to anticipate business trends and develop hypotheses. They can receive automatic alerts to early indicators of excellence or poor performance. It enables IT (information technology) professionals to fully automate and personalize the collection and distribution of knowledge across the organization.

The underlying data to assess the business metrics may come from many sources. For example, a web site that offers pharmaceutical products may collect activity data 32 related to the web site. The web site activity data 32 may contain such basic web metrics as which user accessed what web pages. From the web site activity data 32, a web analysis program, such as data mining module 40, determines actual values 42 for specific business metrics. The business metric actual values 42 form the basis to create the individual business metric scores and aggregate score.

A forecasting and evaluation module 44 analyzes the actual values 42 and determines business metric assessment indicators for each metric 54. The indicators measure the business metrics' performance relative to the business goals 46. Exemplary indicators may include: a forecasted business metric value 56; an actual-forecasted difference indicator 58; an accuracy indicator 60; a performance direction indicator 62; and a business metric score 64.

The forecasted business metric value 56 indicates what a model had predicted the business metric would be for the day. To determine the forecasted business metric value, a variety of analytic forecasting routines may be deployed to analyze the metric's historical values including Single, Double, Linear, Damped Trend, Seasonal, Winters Multiplicative, and Winters Additive Exponential Smoothing. The model may be selected by an analyst based upon which one best predicts the data at hand. The forecast 56 for the current day is computed from the best model as well as corresponding prediction intervals and standard errors for the forecast estimates.

The actual-forecasted difference indicator 58 illustrates the degree of difference between a business metric's actual value and forecasted value for a given day. The accuracy indicator 60 examines how well the forecast model predicts the actual business metric for a given day. Predictive accuracy may be assessed based upon the degree to which the metric's actual value for that day falls within the forecast confidence limits given that the particular day is held out and not used in the forecast estimation and computation.

The performance direction indicator 62 shows on a general level whether a business metric's performance is moving in the right direction or in a less than optimal direction with respect to the company's business goals 46. Directional metadata 48 determines whether a direction is proper for a particular business metric 54. The performance direction indicator 62 is then set based upon comparison of the actual and forecasted values (42 and 56) with the directional metadata 48. The score card 52 also contains business metric scores 64. The business metric scores 64 provide a more detailed assessment of how well each business metric 54 is performing as it is a scaled number which may be used to compare how one business metric is performing relative to other business metrics.

In addition to the business metric assessment indicators, the forecasting and evaluation module 44 generates a composite business metric score 66. The composite score 66 is derived from an aggregation of the individual business metric scores 64. This composite score 66 is an immediate indication of overall performance as it relates to the company's business goals 46.

It should be understood that many different business metrics may be used, including those different from being web-based. For example, business metrics regarding point-of-sale activities 36 may be gathered and associated with activity 32 on the company's web site. For example, people may be visiting the web site to gather information about a company product so that they may later purchase the product at a store. The data mining module 40 interrelates the web activity data 34 with the store's P.O.S. (point of sale) activity data 38 in order to determine the business metrics actual values 42 about the interrelationship. As an example, a company may wish to know what the effect of mere browsers of the company's web site has upon its product sales in the stores. Customer activity data (38 and 34) are collected at both sources and interrelated. The data interrelationship may be formed in a number of ways, such as by identifying customers at the web site through standard cookie customer identification techniques and at the store when the customer identifies himself such as by a credit card purchase. It should be understood that data sources other than web-based or P.O.S. activities may be used. For example, data resulting from advertising campaigns may be collected and interrelated with web site or P.O.S. activities. This allows assessment of the effect that a campaign may have upon a web site or store and how it impacts the business goals 46. The web-based data may also be rolled up to the session or visitor level and augmented with demographic data and provided into the data mining module 40.

Figure 2:
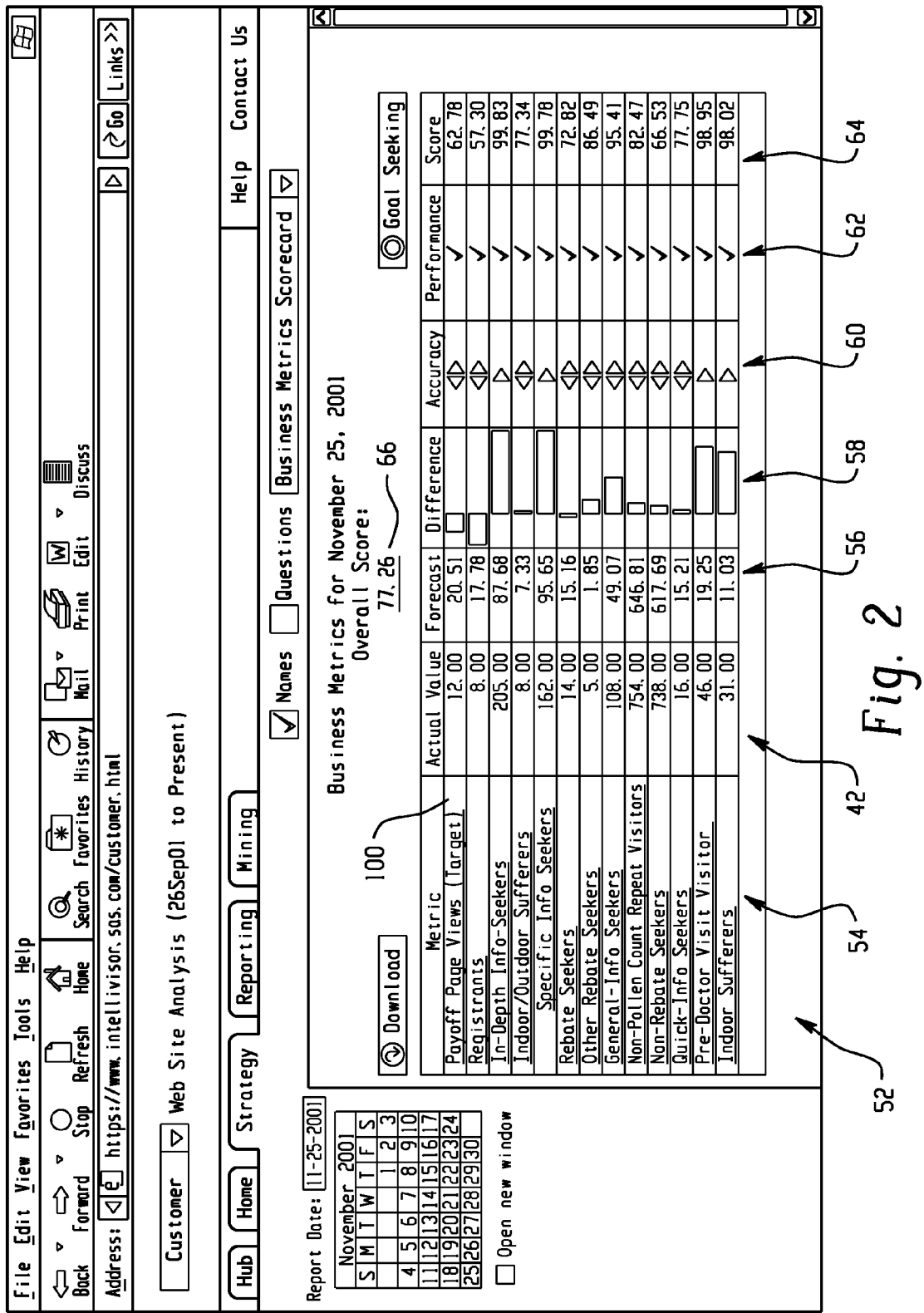
FIG. 2 is a graphical user interface depicting an exemplary business metrics score card.

FIG. 2 provides an exemplary business metrics score card 52. The score card 52 emphasizes the ability to evaluate the overall trend of activity around web site pharmaceutical business metrics and to study how inputs (such as, number of registrants, number of in depth information seekers, number of indoor/outdoor sufferers) can effect a target factor like payoff page views. The target or response variable 100 is listed as the first item in the score card 52. The inputs may then be listed in order of importance relative to how each drives or affects the target variable 100. The value for the current day of the target variable 100 is held out and forecasted using a predictive model. The forecast 56 is then compared with the actual 42 and the difference 58 is displayed. The following may also be displayed: the accuracy 60 to detect whether the actual 42 falls within the prediction confidence limits; a performance column 62 that indicates whether the metric is moving in the right direction; and a business metric score 64 is given that measures the overall direction of the metric 54 in a report card style.

Figure 3:
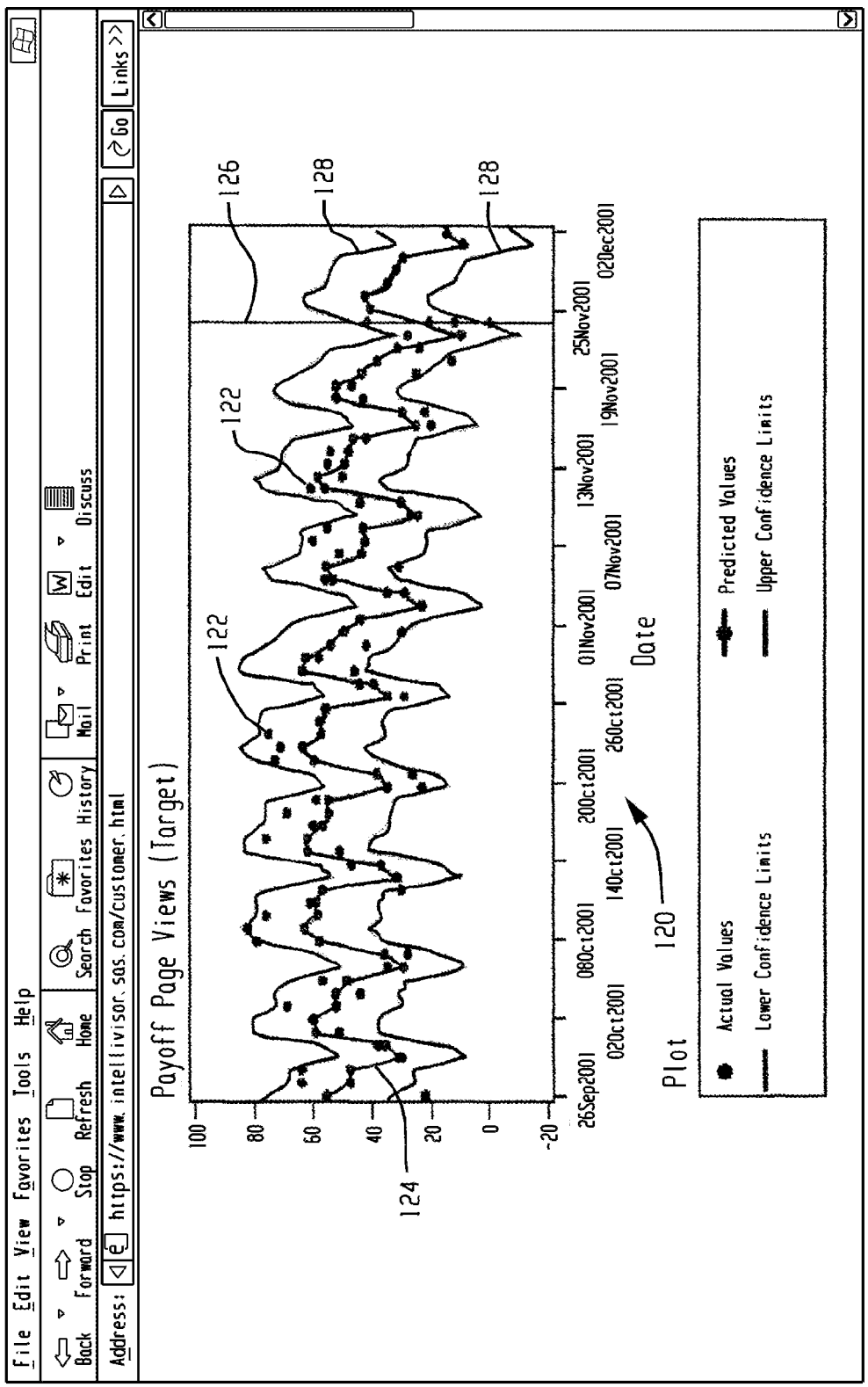
FIG. 3 is a graphical user interface depicting an exemplary x-y graph of a business metric.

A user is able to select a business metric 54 shown in the score card 52 and graphically observe the actuals, predicted values, and forecasts beyond the end of the historical data. FIG. 3 provides an example where a customer selected the payoff page views metric to obtain this type of information. FIG. 3 shows a plot 120 of the payoff page view target business metric versus time. The actual payoff page view values are shown at 122. Curve 124 contains the forecasted payoff page view values, and forecasted values on the curve beyond time line 126 show payoff page view forecasts beyond the end of its historical data. Confidence bands 128 at a 95% level bound the forecast curve 124.

Figure 4:
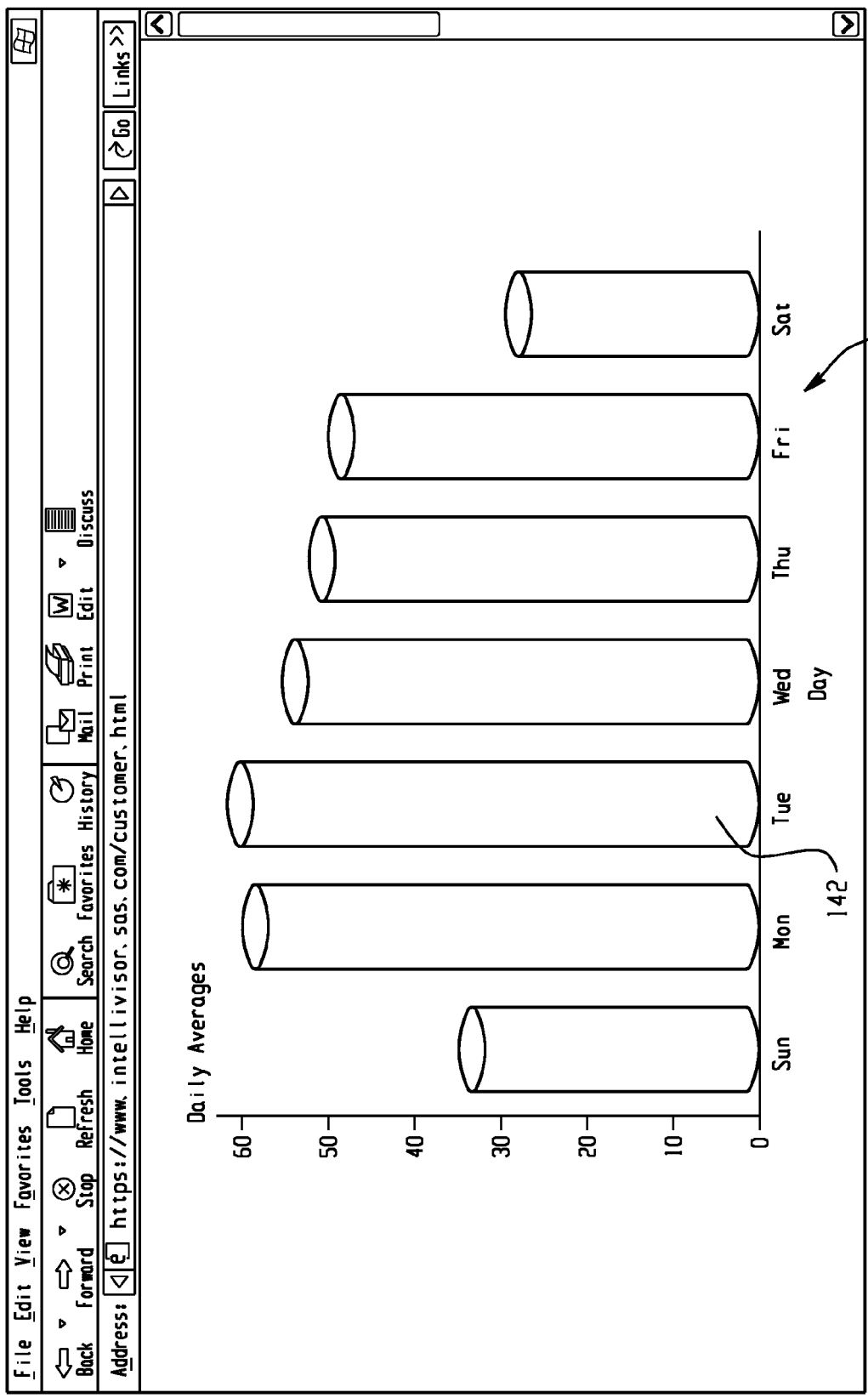
FIG. 4 is a graphical user interface depicting an exemplary bar graph of a business metric.

A user can focus upon the target metric's values within a particular time frame. FIG. 4 provides an example where the target metric (e.g., payoff page views) is analyzed over a one week period. The graph 140 shows a drop in user activities over the weekend with Tuesday 142 being one of the busiest days. Graphs may be generated for other weeks to determine whether the daily variation shown in FIG. 4 contains a pattern shared by the other weeks. Thus, if the pattern reveals Tuesday as the busiest day throughout most of the year, then the company can decide to provide new materials on the web site on Tuesdays.

Figure 5:
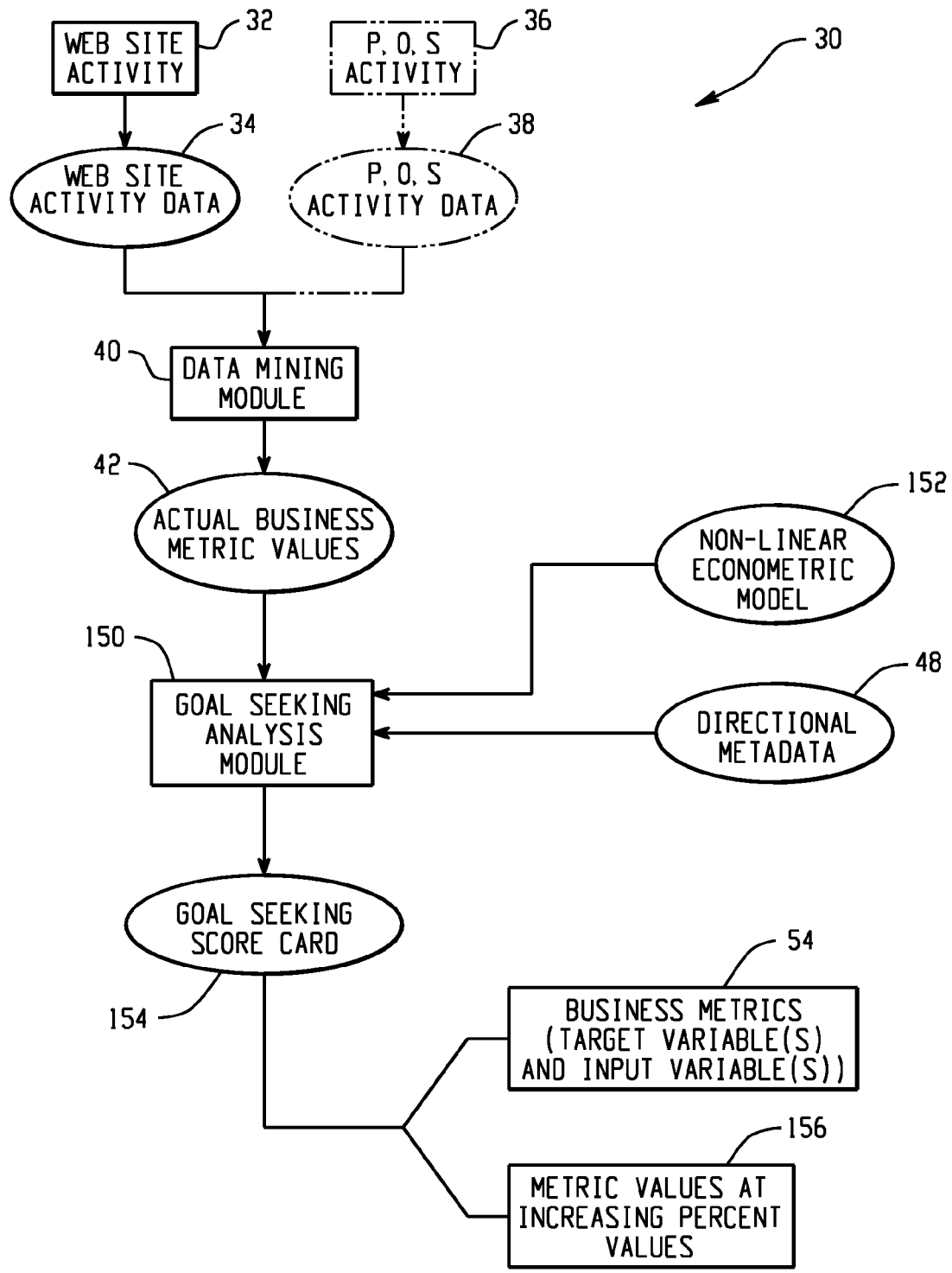
FIG. 5 is a block diagram depicting software and computer components utilized in performing goal seeking.

FIG. 5 depicts software and computer components utilized in performing goal seeking analysis. A goal seeking analysis module 150 evaluates how the input variable business metrics can be adjusted to achieve a desired level change in a target business metric. The directional metadata 48 informs the goal seeking analysis module 150 which level change direction is desirable. The directional information is used because certain target business metrics may seek to have its level decreased, while other target business metrics seek an increase. The goal seeking analysis module 150 fits a nonlinear econometric model that adjusts for autocorrelation due to the seasonal nature of the data 152 to the target and non-target business metric actual data 42.

After the econometric model 152 is fit to the actual data 42, the goal seeking analysis module 150 generates a goal seeking score card 154. The goal seeking score card 154 shows at what new levels 156 non-target business metrics should be in order to achieve a desired level change in a target business metric.

Figure 6:
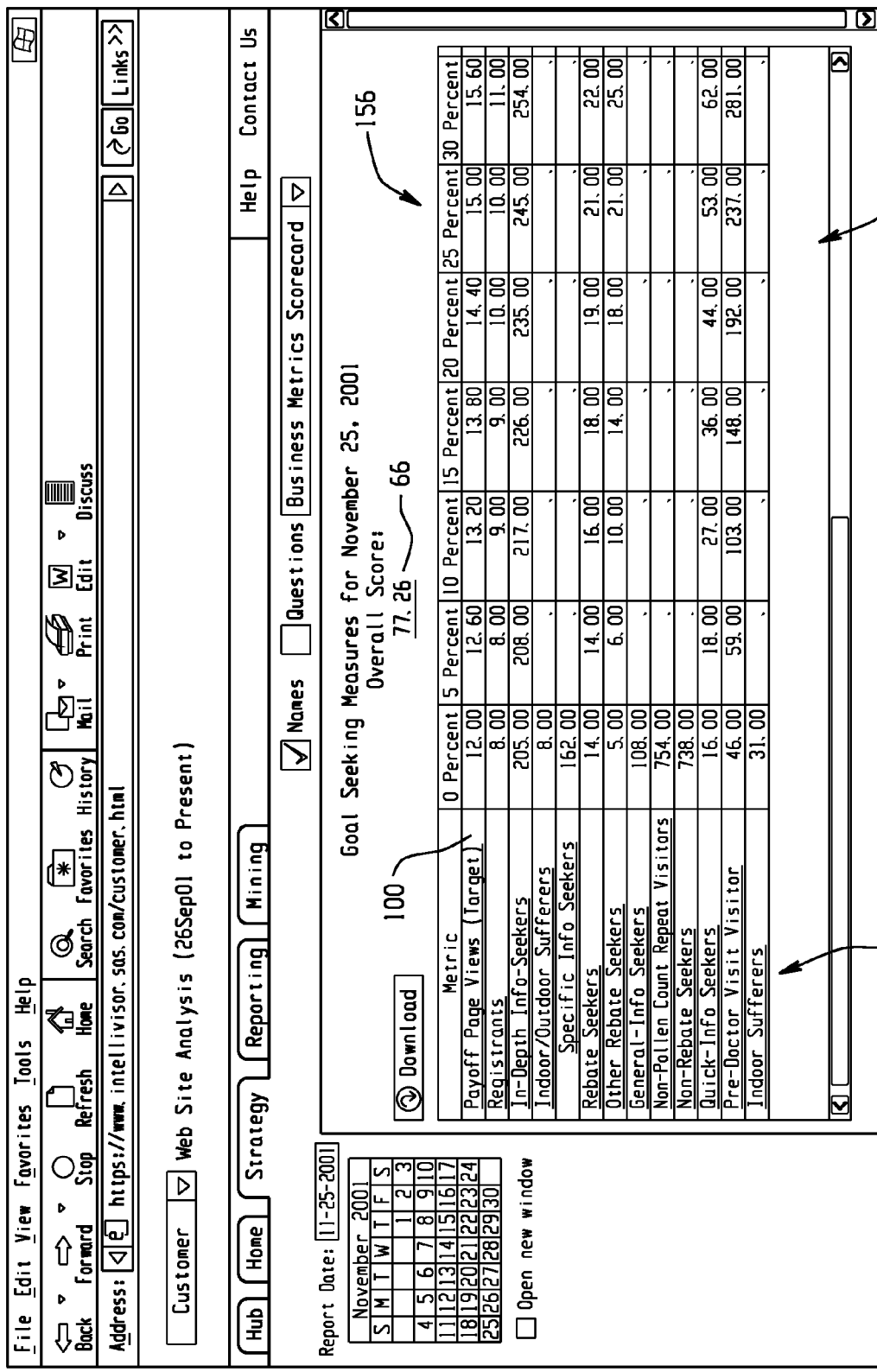
FIG. 6 is a graphical user interface depicting exemplary goal seeking measures.

FIG. 6 shows an exemplary goal seeking score card 154 for a target business metric 100. The goal seeking analysis suggests new levels in business inputs to achieve a higher response in a business target 100 which in this case represents payoff page views. The business metric column 54 lists the metrics with the first one being the target business metric 100. Succeeding columns 156 indicate what changes are needed in a non-target business metric for a given percentage change in the target business metric 100. The 0 percent column provides levels for the non-target business metrics with no change in the target business metric level. The 5 percent column shows what non-target business metric level changes are needed to produce a 5 percent increase in the target business metric (i.e., a 0.6 payoff page view increase). For example, if it were determined that less resources are needed to increase the number of "in-depth information seekers" than to increase the number of "pre-doctor visit visitors" to produce the same corresponding 5% or 10% increase in the target business metric, then a business decision may be made to proportion resources on increasing the number of "in-depth information seekers."

Figure 7A:
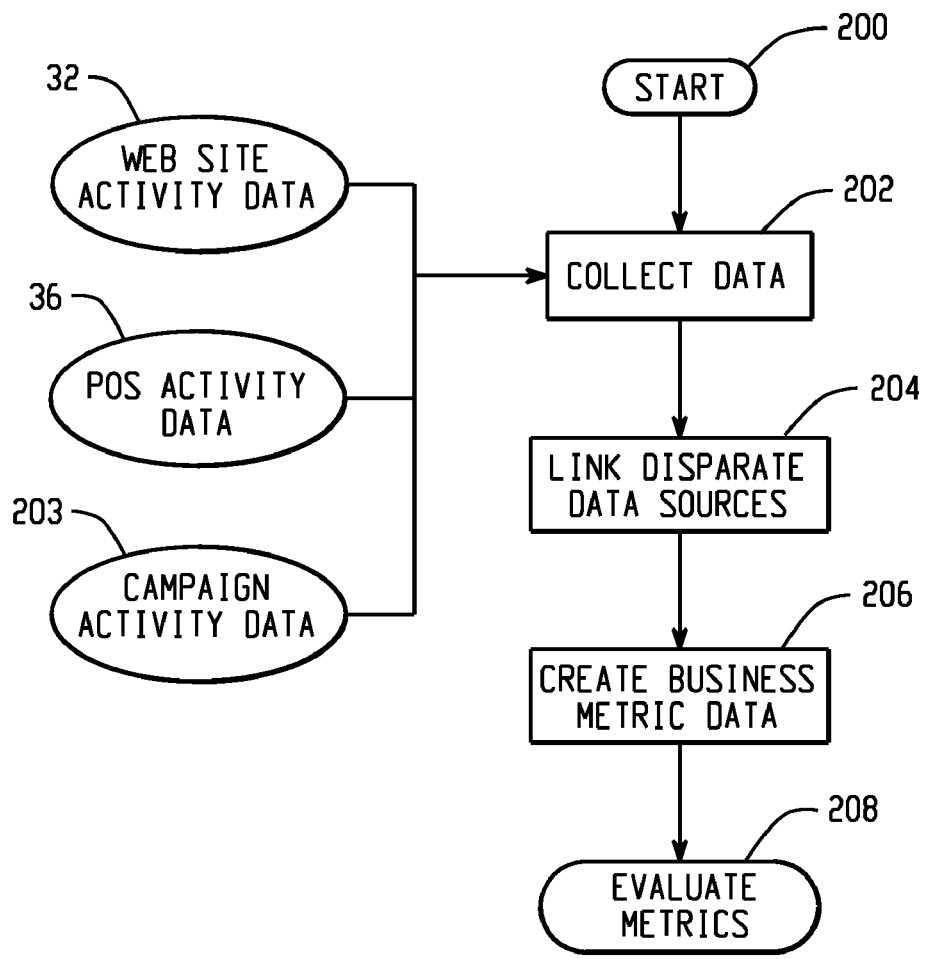
FIGS. 7A-7C are flowcharts depicting an exemplary operational scenario for generating business metric score cards and other analyses for a product selling web site.
Figure 7B:
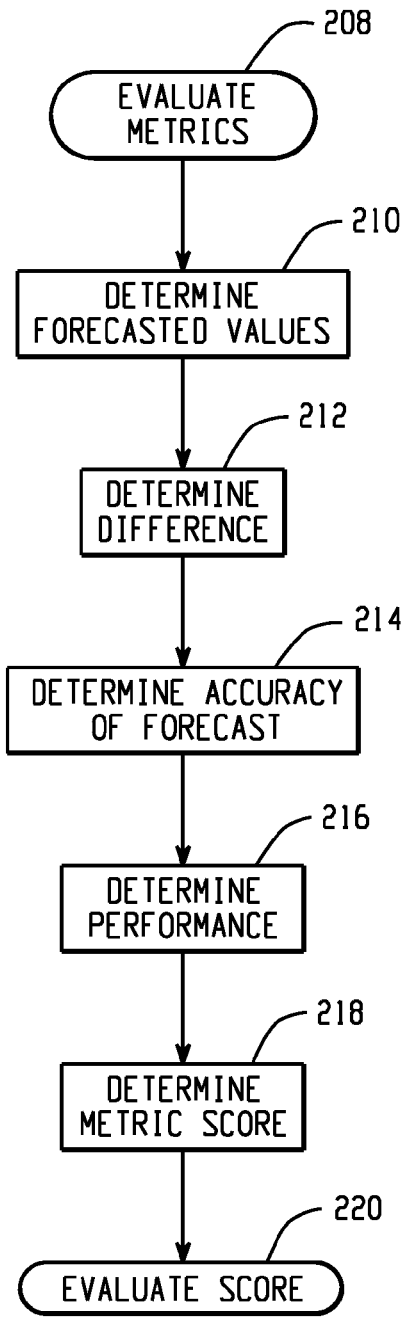
Figure 7C:
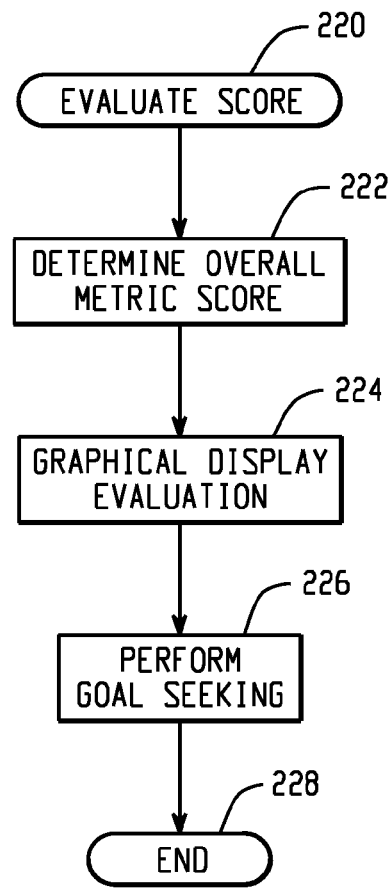

FIGS. 7A-7C depict an exemplary operational scenario for generating business metric score cards and other analyses for a web site that sells products. With reference to FIG. 7A, start block 200 indicates that processing for the exemplary operational scenario begins at process block 202. At process block 202, data from one or more data sources are collected. In this example, data sources may include web site activity data 32, P.O.S. activity data 36, and campaign activity data 203. If data is to be collected from different sources, then process block 204 links the data from the disparate data sources. This allows assessment of the effect of one type of activity upon another activity, such as the effect a campaign may have upon a web site, or a web site may have upon P.O.S. activity.

Process block 206 creates business metric data. Software products such as WebHound™ (from SAS Institute Inc. located in North Carolina) may be used to read the company's web site traffic data, summarize the information for detailed and historical analyses, and define the information into a data warehouse. The WebHound reports provide details about web site traffic (e.g., who is visiting your site, how long a visitor stays, what information or pages the visitor is viewing, etc.). This information is then accumulated over time to construct a set of basic web metrics.

In this example an application service provider (ASP) framework is used wherein each night the system receives the customer weblogs after 12:00am local time. The weblogs are unzipped, placed in a file directory, and analyzed using WebHound. WebHound determines the business metric actual values for the web activity that occurred during the 24 hours of e-retailing. The business metric variables and their labels may include:

new_reg: New Registrations;
num_session: Number of Sessions;
ext_ref: Number of visitors coming from referrer;
error_percentage: Percentage of page views that returned error status codes;
referrer_effect: Out of all referred customers, percentage that made purchases;
percent_regist_sessions: Percentage of visitors returning to domain;
percent_buy_sessions: Percentage of sessions where purchase was made;
avg_duration: Average length of time in domain (in minutes);
avg_clicks_until_cart: Average number of clicks to first shopping cart;
perc_abandon_carts: Percentage of abandoned shopping carts;
avg_pages_buyers: Average number of clicks in purchasing sessions;
avg_pages_nonbuyers: Average number of clicks before exiting without a purchase; and
total_buy_session: Total number of purchasing sessions.

Figure 8:
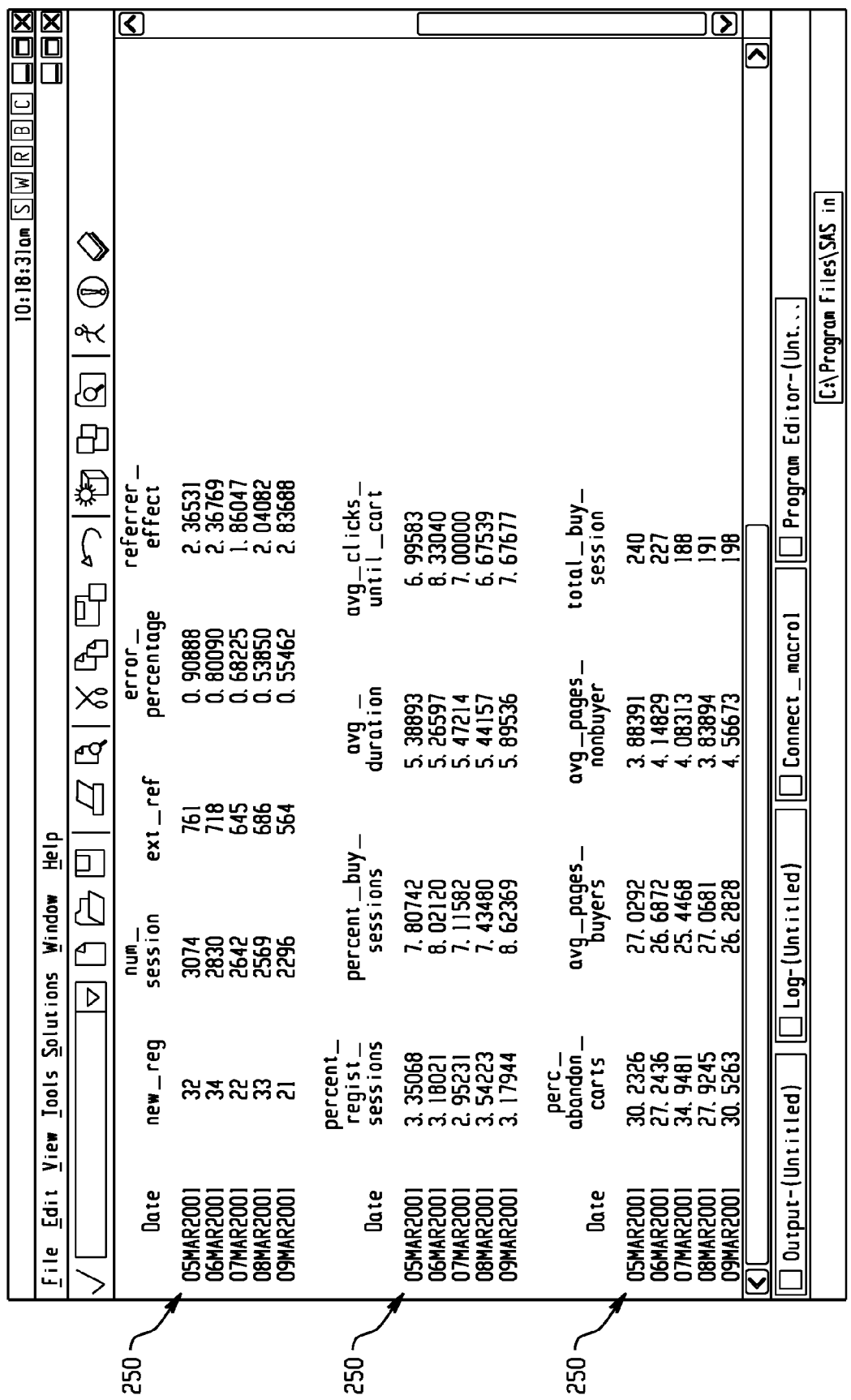
FIGS. 8-14 data calculation output displays associated with the exemplary operational scenario described in FIGS. 7A-7C.

FIG. 8 shows exemplary actual values over a five day period 250 for these business metrics as determined by WebHound.

Figure 9:
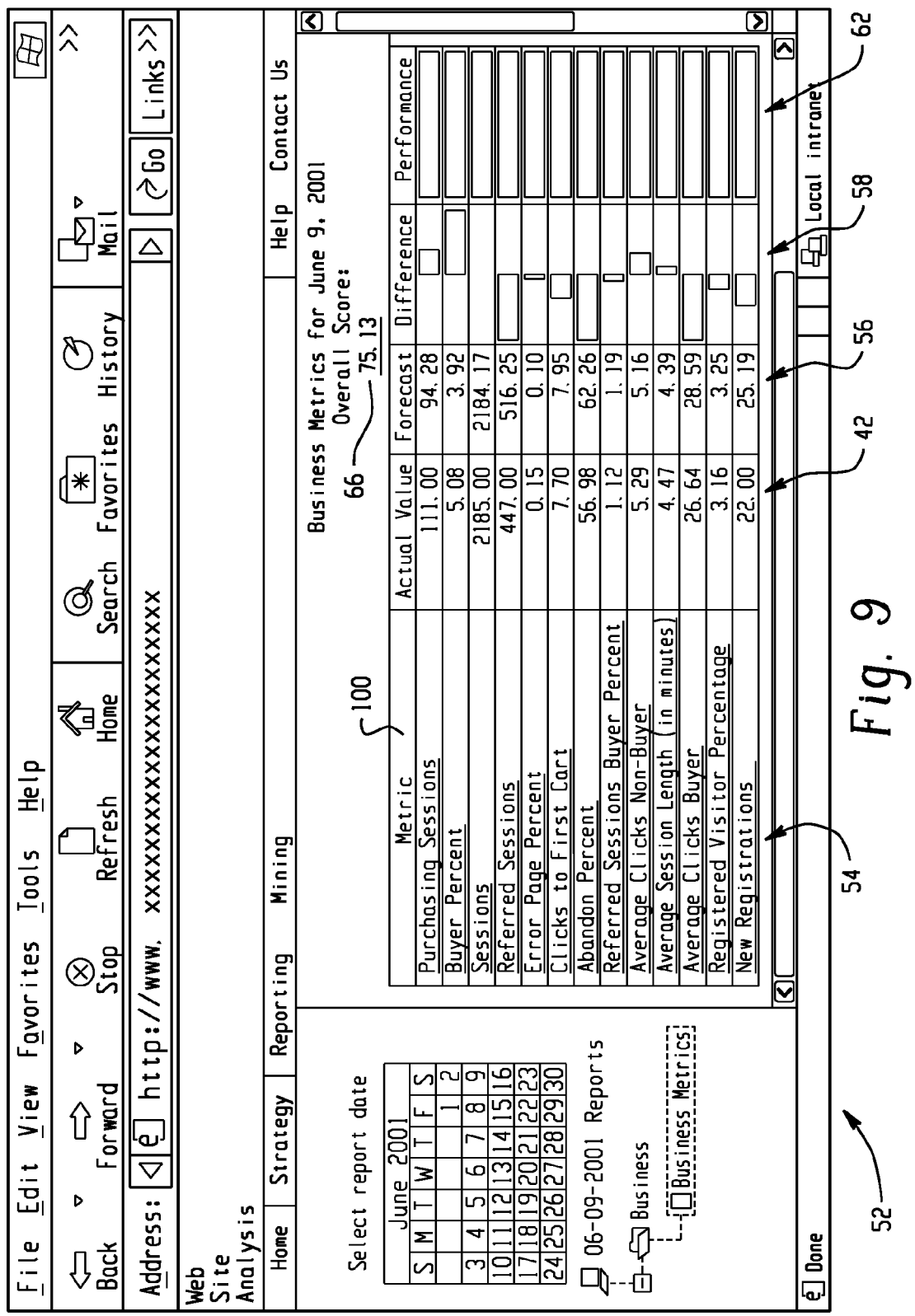

The next set of operations in the scenario deal with evaluation 208 of the derived business metrics. A score card 52, such as the one presented in FIG. 9, allows a user to evaluate the business metrics. With reference to FIG. 9, the score card 52 provides the actual values 42, forecasts 56, difference indicators 58, and performance indicators 62 for the business metrics 54. The scores (not shown in this example) may also be generated for each business metric 54. The details of the score card generation is described in relation to FIG. 7B.

With reference to FIG. 7B, process block 210 determines for the score card forecasted values through a statistical fit of a business metric's data. The percent_buy_sessions business metric (denoted as "Buyer Percent" in the score card of FIG. 9) is forecasted via a statistical fit of a model. A variety of analytic forecasting routines may be selected to fit the business metric, such as Single, Double, Linear, Damped Trend, Seasonal, Winters Multiplicative, and Winters Additive Exponential Smoothing. The model selection is based on the minimization of the root mean square error. Historical data is used prior to the current daily value. The forecast for the current day (denoted "Forecast" in the score card) is computed from the selected model as well as corresponding prediction intervals and standard errors for the forecast estimates. Since the current day's value is removed (8 Jun. 2001 in this case) the standard error of the forecast estimate is independent of the observed daily value.

Figure 10:
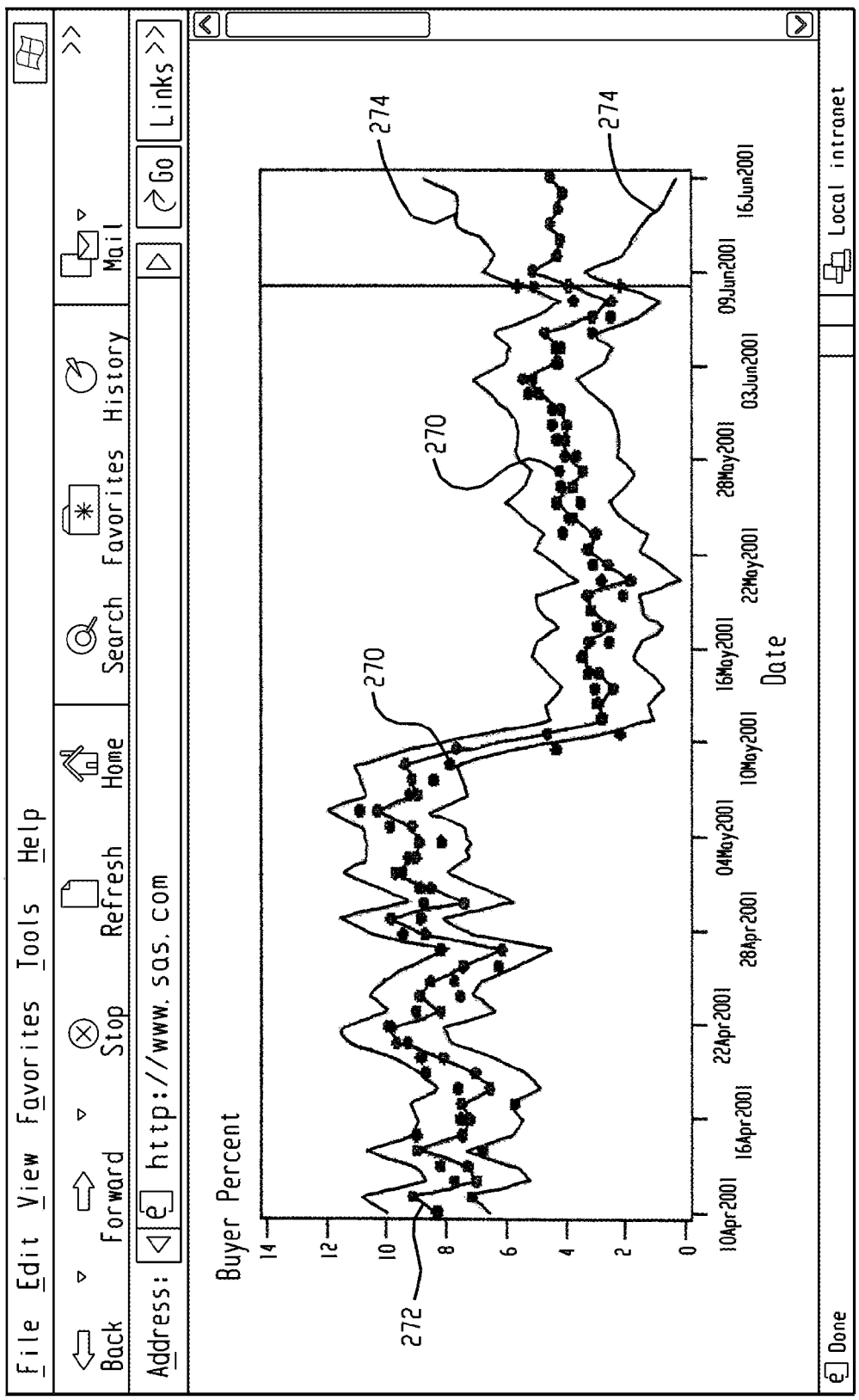

FIG. 10 displays an example fit for the buyer percent business metric. Data points 270 represent the observed data, and the points on the forecast curve 272 represent the predictions. Confidence limits 274 bound the forecast curve 272 at a 95% level.

With reference back to FIG. 7B, process block 212 calculates standardized differences $(Y_1 - \hat{Y}_i)/s_{\hat{Y}}$ for each metric, and visual indicators are generated for the score card based upon the calculated differences. Process block 214 assesses the accuracy of the forecast such as by examining whether the day's actual value is above, below, or within the upper and lower limits set for the individual metric. A visual indicator is generated for the score card based upon the assessment by process block 214.

Process block 216 determines business metric performance indicators. A business metric's relative direction is determined through a comparison of the actual and forecasted values. An examination of the business metric's directional metadata with the actual-forecasted comparison shows whether a particular business metric's performance is moving in an overall proper direction. Visual green checks may be used to indicate a proper direction for the business metric on the score card. Visual red marks may be used to indicate an undesirable direction.

Process block 218 determines numerical scores for each business metric. In contrast to the general performance direction indicators of process block 216, the business metric scores of process block 218 provide a more detailed assessment of how well the business metrics are performing. The scores are scaled similarly for each business metric despite the business metrics possibly having different original ranges and directions. For example from a retailing business perspective, many times it is desirable that the observed actual values of a metric should be larger than the forecast value. For buyer percent this means performance improves when the actual daily value is larger than the prediction. For a metric like error page percent smaller values are preferred. If the preferred direction is greater than the forecast then the score is calculated as follows:

$$\left(1/\sqrt{2\pi} \int_{-\infty}^{x} e^{-t^2/2} dt/2 + .5\right) * 100 \quad \text{where} \quad x = \left((Y - \hat{Y})/s_{\hat{Y}}\right)$$

Thus when Y is very small the score has a minimum value of 50%. When Y matches the prediction, the score has a value of 75% and increases towards 100% as Y gets larger than the prediction. When the preferred direction of the business movement is less than the prediction, the score is calculated based on the following:

$$\left(1-\left(1/\sqrt{2\pi}\int_{-\infty}^{x}e^{-t^2/2}\,dt/2\right)\right)*100 \quad \text{where} \quad x=((Y-\hat{Y})/s_{\hat{Y}})$$

The next set of operations deals with evaluation 220 of the score and are described in relation to FIG. 7C. With reference to FIG. 7C, process block 222 determines an overall metric score. Process block 222 aggregates the business metric score values into an overall score that is presented to the company. This aggregate score is an immediate indication of performance as it relates to the company's business goals established for web site exploitation. More specifically, process block 218 first regresses the target business metric "purchasing sessions" on the other non-target metrics while treating "1-p" values as weight statistics. These weight statistics are multiplied by the business metric individual scores to calculate an overall daily mean score. An example of such calculations for the overall business metric score for FIG. 2 is the following:

[(Payoff Page View Target Score*weight)+(Registrant's Score*weight) +. . . +(Indoor Suffer's Score*weight)]/(number of contributors)]=
[(62.78*1)+(57.30*0.97)+. . . +(98.02*0.03)/13]=77.26

Note: "1-p"=0.97; "p"=0.03; and the weight for the Payoff Page View Target Score is 1 because it is the target.

It should be understood that the score card may be supplemented in many ways, such as by providing a traffic lighting icon to indicate whether the area measured by the metric is performing poorly, adequately, or very well. A red traffic light in any of the score cells may indicate that the score for that metric is below a predetermined threshold, such as 60. The threshold of 60 may be changed to suit the situation at hand.

Figure 11:
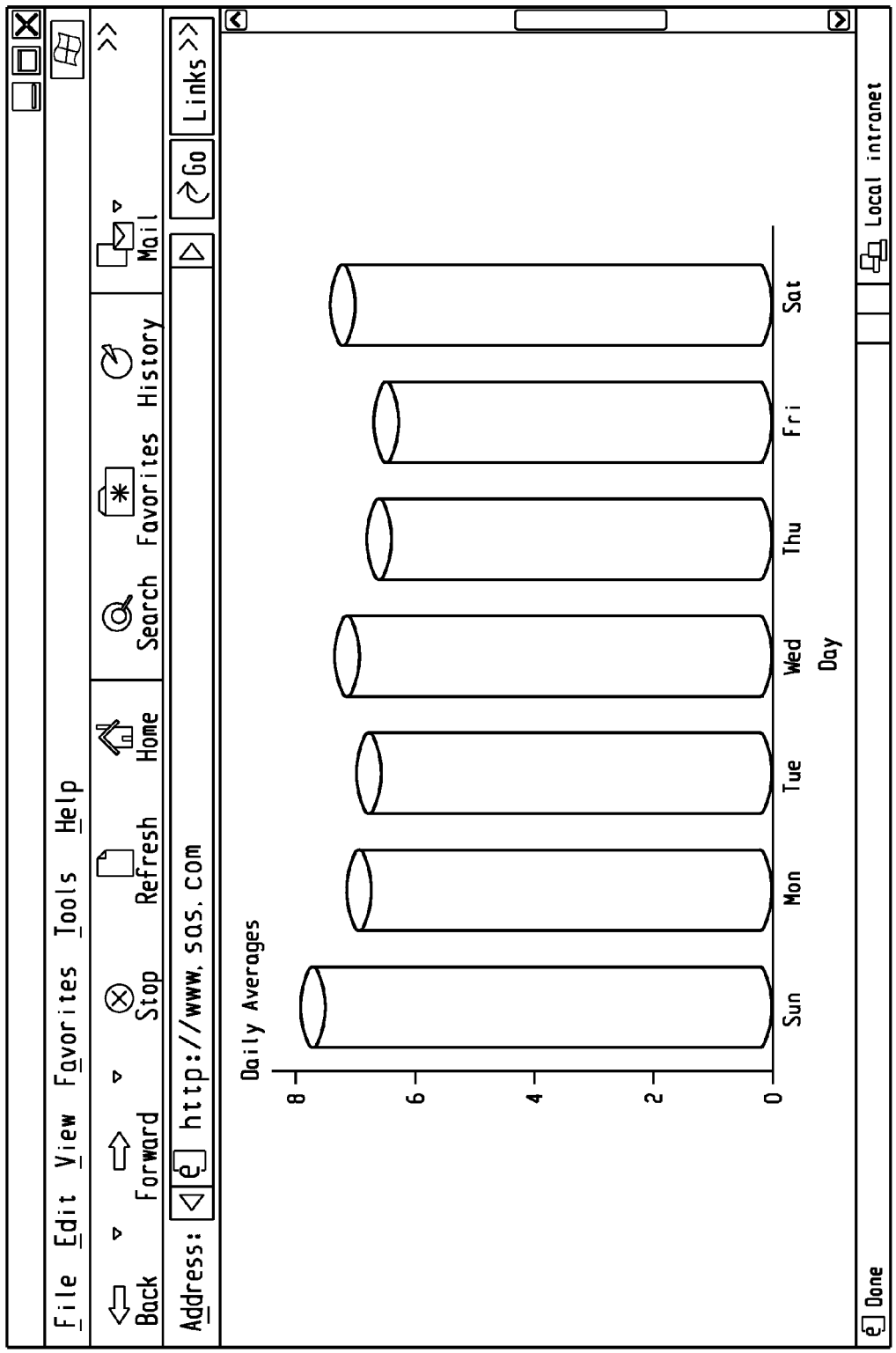

At process block 224, a user can evaluate business metrics and scores through graphical visual techniques. As described above in reference to FIG. 10, a forecasting graph may be shown to evaluate the predictions for a business metric. FIG. 11 shows another example of a graphical evaluation technique. The bar chart of FIG. 11 shows the daily averages for the buyer percent business metric. The date ranges may vary depending upon user selections.

It should be understood that the score card may provide direct access to one or more graphical evaluations of the business metrics. In such an embodiment, the score card provides a centralized mechanism for not only providing scorings for each business metric but for accessing visual evaluation graphics. The score card may also provide access to the goal seeking analysis.

With reference FIG. 7C, user access of the goal seeking analysis invokes process block 226. Process block 226 solves for inputs one at a time when setting the level of a target at certain values. An econometric model is fit to the target and non-target business metric actual data. The econometric model may use a linear model to perform the fit, but also may use a non-linear model to account for the daily seasonal effects.

Figure 12:
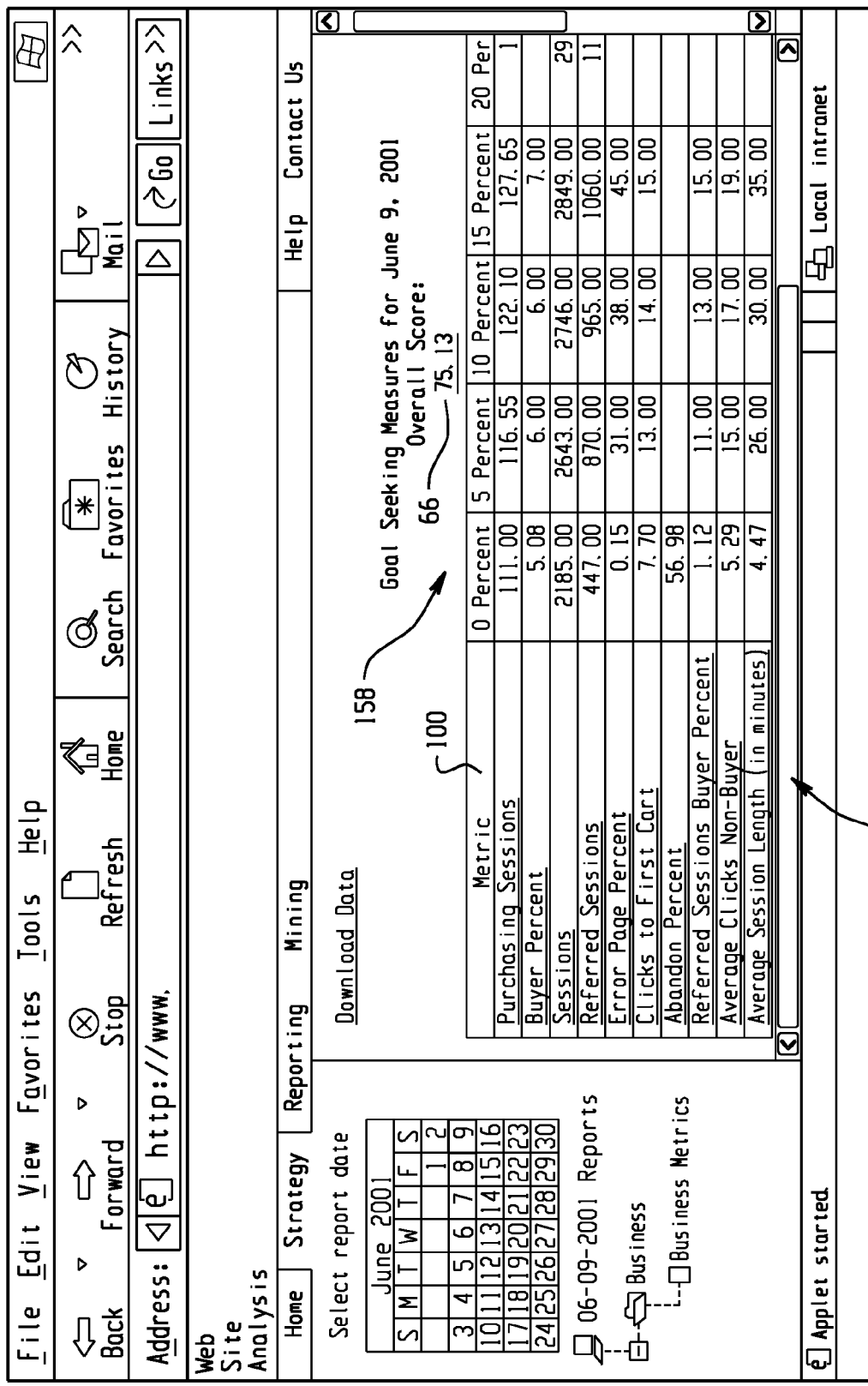

Goal seeking results for this example are shown in FIG. 12. FIG. 12 shows a goal seeking score card 154 where values of the input business metrics that satisfy increasing values of the target purchasing sessions 100 are provided in columns 158. The 0 Percent column indicates the current daily settings for the metrics on 8 Jun. 2001. A 15 percent increase in the target 100 would set the number of purchasing sessions at a value of 128. To achieve this goal would require 2849 sessions assuming all the other inputs remain at their 0 percent level (i.e. the 8 Jun. 2001 value). This provides a mechanism to see the settings that are required to achieve increases in the target or response variable 100. To generate these projected levels in this example, a model is created in which the relationships among the variables comprise a system of one or more non-linear equations. For example, the following model regresses the business target metric "total_buy_session" on the business metrics "perc_abandon_carts" and "ext_ref":

total_buy_session$_t$=$b$0+$b$1*ext_ref$_t$+2*perc_abandon_carts$_t$+$U_t$

Figure 13:
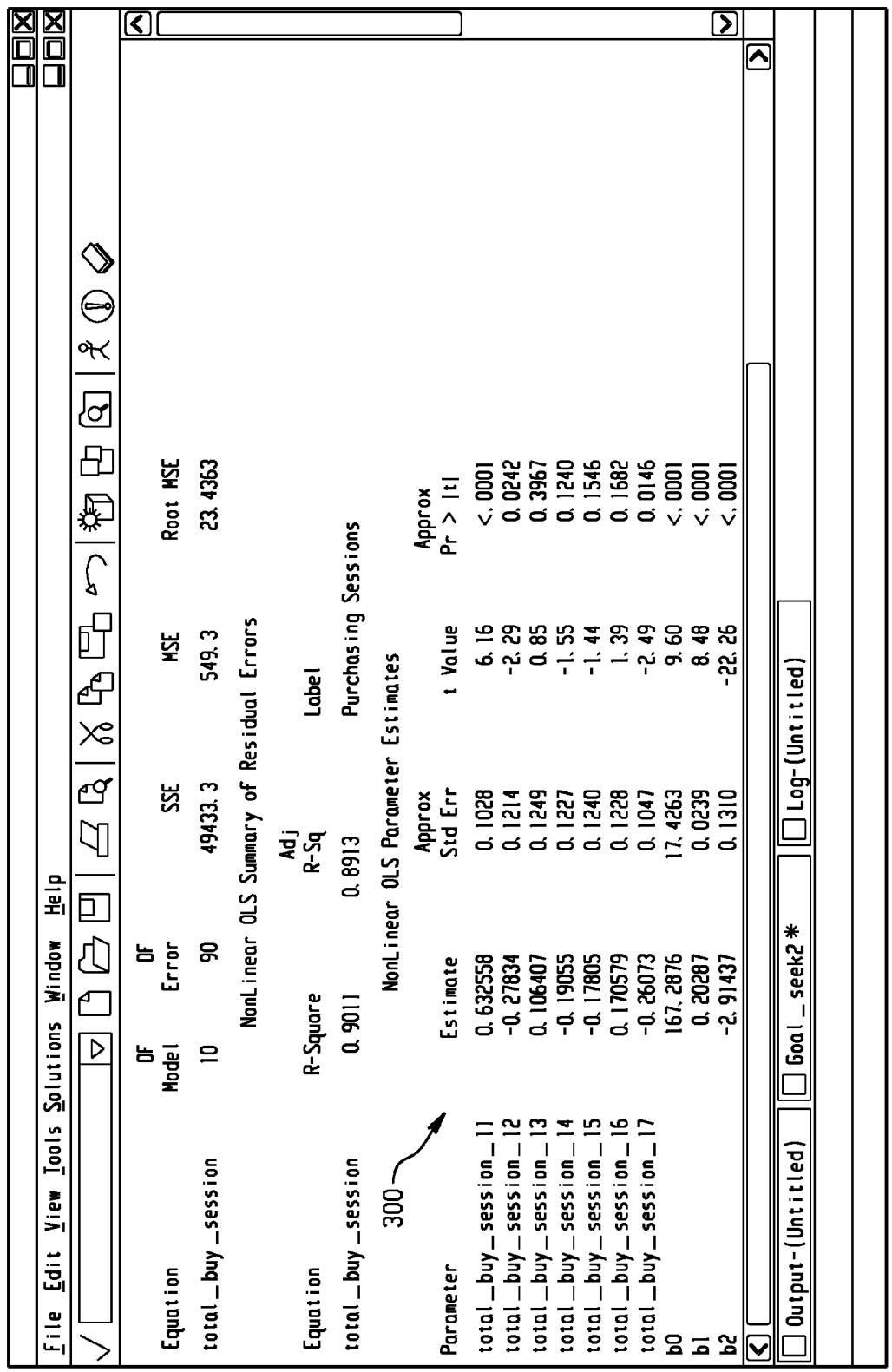

Where: the subscript "t" denotes the time period; and $U_t=P_1*U_{t-1}+P_2*U_{t-2}+\ldots+P_7*U_{t-7}+\epsilon_t$ The model's solution is shown at 300 in FIG. 13. The model's solution 300 determines what values of the input variables would satisfy the 15% increase for the target variable total_buy_session. The output examines the parameter estimates and test statistics. Lags 3 through 6 for the autoregressive errors "U$_t$" coming from the model are not statistically different from 0. The sign of the coefficient on ext_ref is positive and negative for perc_abandon_carts.

Figure 14:
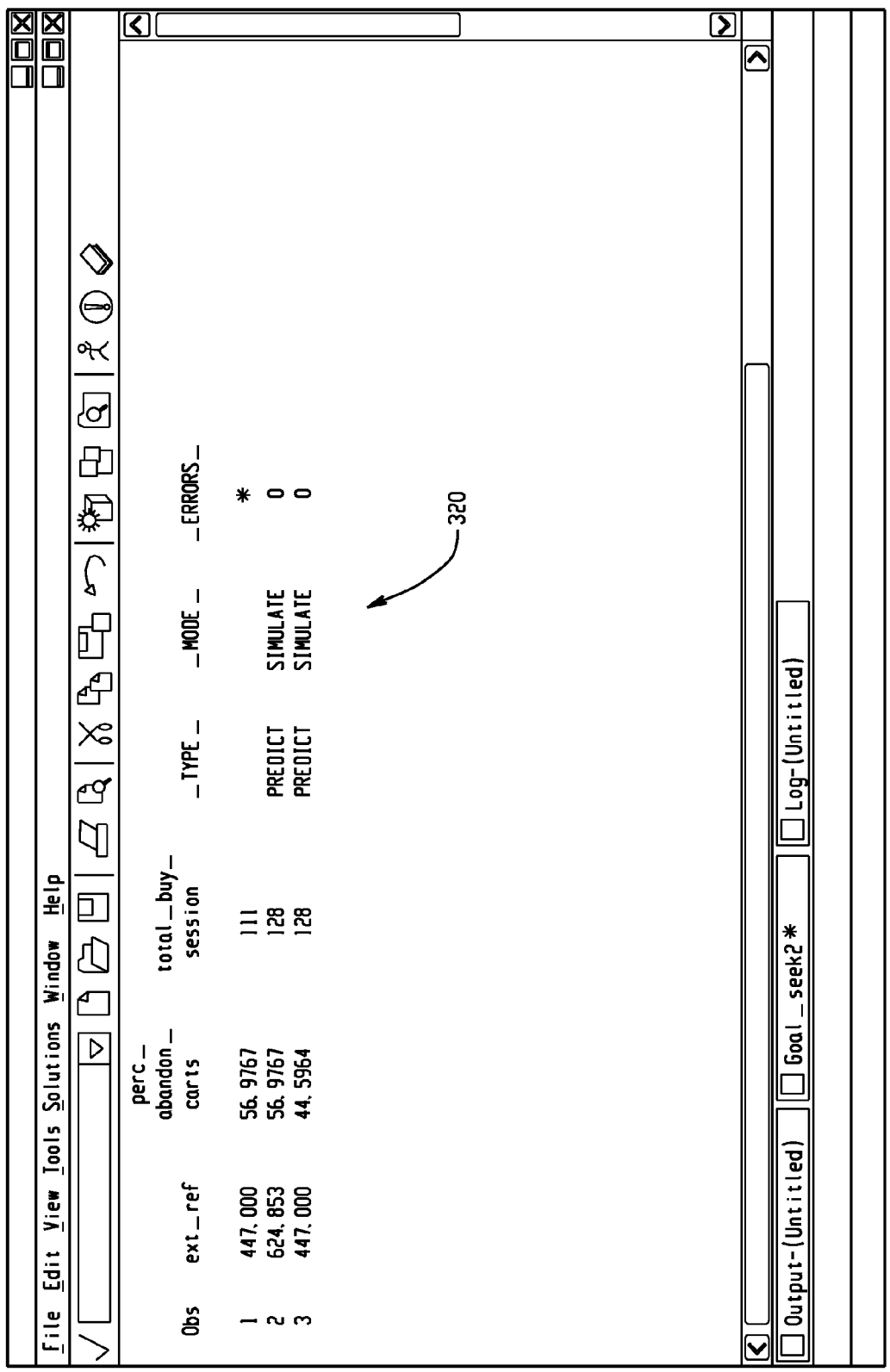

FIG. 14 shows at 320 the data results when the model is solved to determine what value of the input variables would satisfy the 15% increase for the target variable total_buy_session. Observation 1 shows the values for ext_ref, perc_abandon_carts, and total_buy_session on 8 Jun. 2001. Through use of the fitted model with autoregressive errors, observation 2 demonstrates the increased level in the number of visitors coming from an external site required to achieve the total number of purchasing session at 128 when leaving the percentage of abandoned shopping carts at its observed value of 56.9767. Similarly, the decrease in the level of percentage of abandoned shopping carts to 44.5964 would be required to achieve a value of 128 for total_buy_session when leaving ext_ref at its observed level of 447 for 8 Jun. 2001. With reference back to FIG. 7C, processing for this exemplary operational scenario terminates at end block 228.

Figure 15:
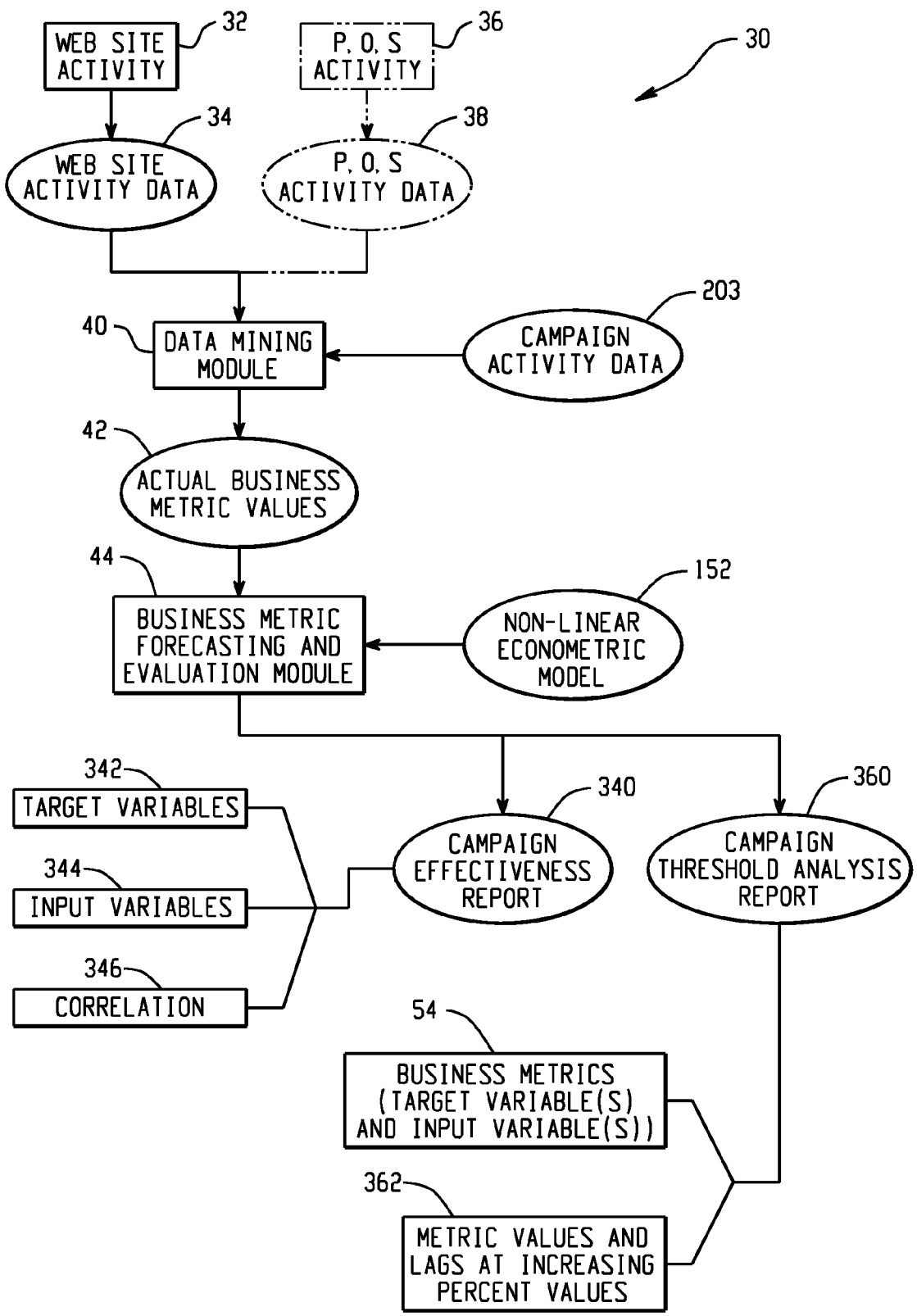
FIG. 15 is a block diagram depicting software and computer components utilized in campaign analysis.

FIG. 15 depicts software and computer components utilized in campaign analysis. With advertising costs presently reaching $300,000 for a one or two minute television slot or higher for advertising during special events, campaign resources must be judiciously allocated. The campaign analysis performed by the system 30 allows business managers to understand how effective their advertisement campaigns are and how the campaigns may be optimized with respect to company business goals.

The business metric forecasting and evaluation module 44 provides for campaign activity assessment by examining campaign activity data 203 in relation to one or more other activities (e.g., 32 and 36). As an example, the module 44 may assess what effect a company's television advertisement campaign had upon the company's web site or upon P.O.S. purchases.

The module 44 generates a campaign effectiveness report 340 which shows which input campaign-related input variables 344 may be closely correlated with target business metric variables 342. The module 44 may determine that certain audiences were more affected by the campaign to access the company web site than other audiences. The module 44 may determine and show the correlation 346 between audience groups and target variables. Audience groups that are highly correlated to product purchases may be more focused upon by future marketing campaigns, thereby making better use of advertising resources. It should be understood that many different campaigns may be analyzed by the system, such as printed advertisement campaigns as well as radio advertisement campaigns.

FIG. 16 depicts at 380 an exemplary campaign analysis report. In this example, the effect of various campaign-related input variables 382 are examined with respect to business metric web target variables 384. R square values 386 provide a measure of correlation between the input variables 384 and target variables 382. The R square column 386 is sorted to determine which campaigns are having a greater affect upon which web target business metrics 382.

For example, the first row in the report 380 contains an input variable cable_a35_plus_grp (representative of people 35 years or older that watched an advertisement on cable). The forecasting and evaluation module examined what correlation the input variable had relative to the target variable consumer_sample_info_pages (note: this business metric web target variable indicates the number of consumers that viewed information about product samples on the company's web site). With an R square value of 0.80, the input variable cable_a35_plus_grp has a relatively high correlation with respect to the target variable consumer_sample_info_pages. The company may have specified a business goal for its web site that it wanted to have a certain number and category of people view its web site after showing the advertisement on a cable station. The report 380 provides an effective way of assessing whether the business goal has been reached and whether the advertising campaign should be modified to better meet the business goal.

Figure 17:
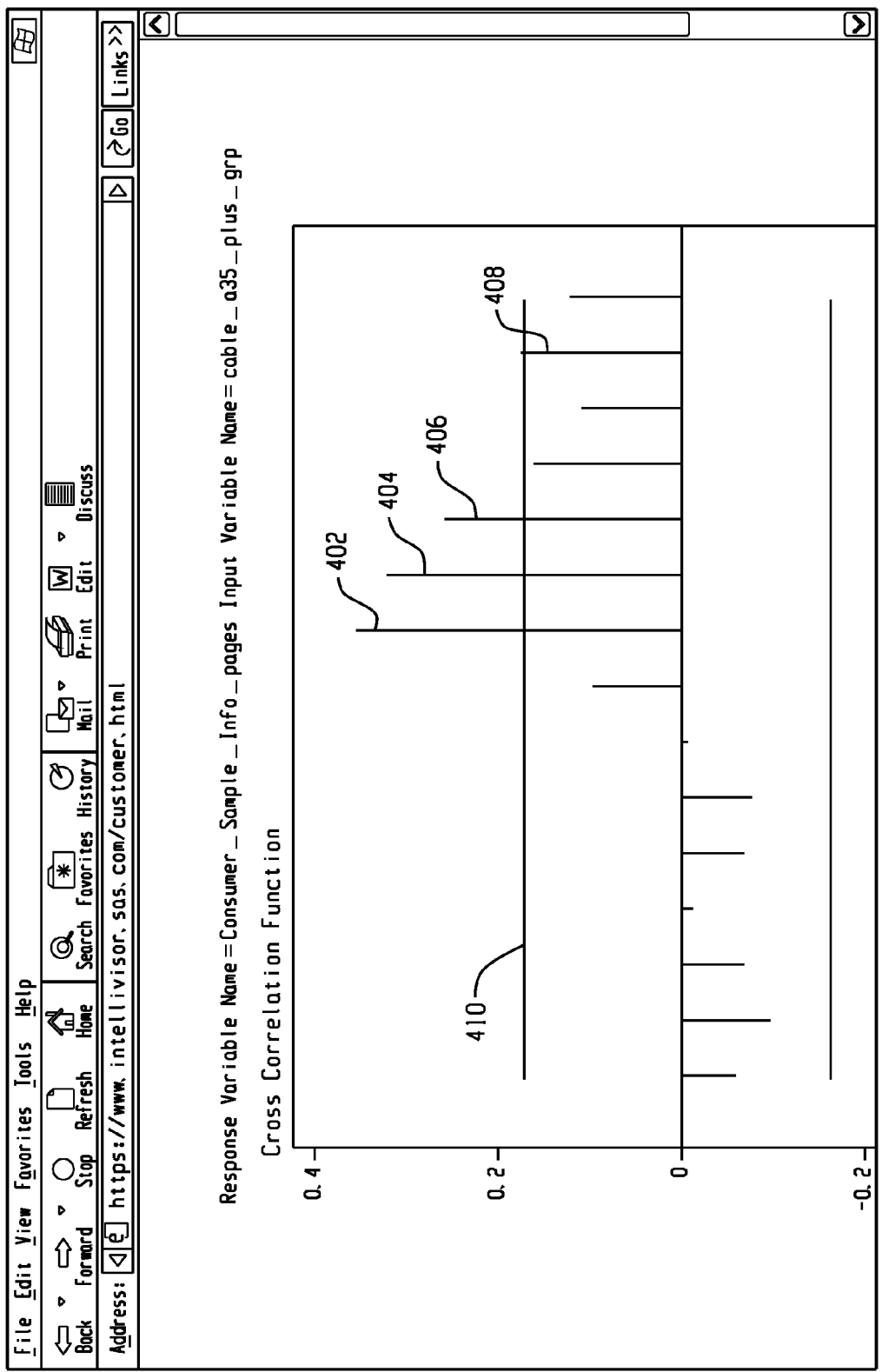
FIG. 17 is a graphical user interface depicting an exemplary cross correlation campaign analysis graph.

Other mechanisms may be used to gain insight into a campaign's effectiveness. As shown in FIG. 17, one such mechanism is a cross correlation campaign analysis graph 400 wherein the effectiveness in the campaign can be examined relative to the delay in terms of days. The graph 400 has along the abscissa axis a time dimension, such as days. The graph 400 shows along the ordinate axis a correlation dimension whose values range from −1 to 1.

In this example, the graph 400 examines how the response target variable consumer_sample_info_pages is affected by current and lag values for the input variable cable_a35_plus_grp. People respond one, two, three and six days after the campaign. This is shown by responses 402, 404, 406 and 408 that have exceeded threshold 410. There is no lag zero correlation which indicates the response on the company web site is not immediate after seeing the advertisement.

Figure 18:
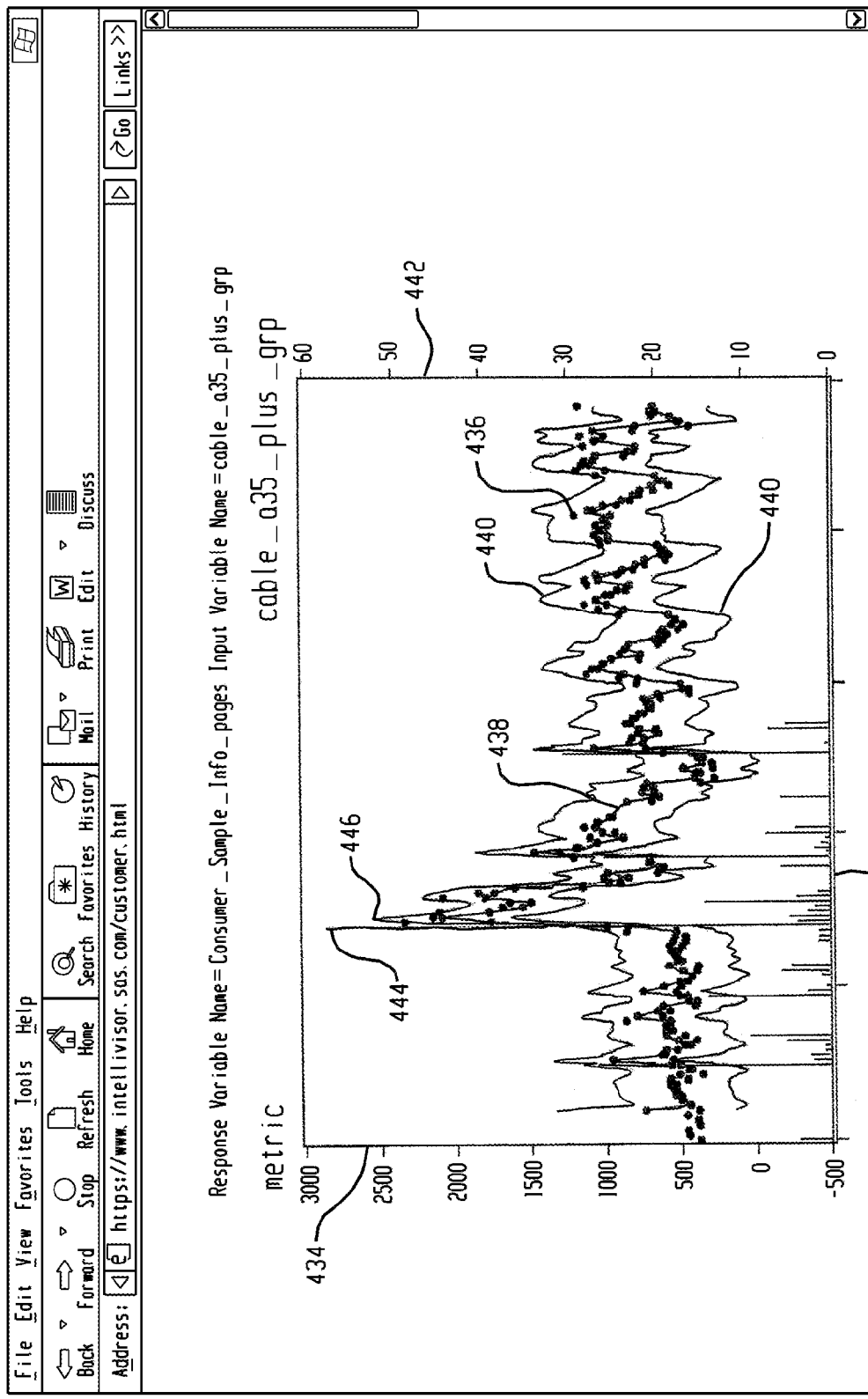
FIG. 18 is a graphical user interface depicting an exemplary campaign response variable analysis graph.

FIG. 18 depicts another mechanism to examine campaign effectiveness. In FIG. 18, an exemplary campaign response variable analysis graph 430 is shown. Time is the dimension for the abscissa axis 432 and may be in units of days. The business metric consumer_sample_info_pages comprises the dimension for the first ordinate axis 434 and represents the number of viewings of the company's web site product information pages.

The actual daily number of viewings of the company's web site product information pages is shown by data points 436. The predicted daily number of viewings of the company's web site product information pages is shown by the points on curve 438. Upper and lower confidence bands 440 bound the curve at a 95% confidence level. As can be seen by the predicted points on curve 438 and actual points 436, the curve 438 predicts well the actual values 436.

On the graph 430, the input variable cable a35_plus_grp comprises the dimension for the second ordinate axis 442 and represents (in units of 100,000) people 35 years or older that watched an advertisement on cable. Vertical line responses (e.g., response 444) show the advertisement exposure amount for this group of people. The gap between a peak in the cable_a35_plus grp dimension (as shown for example by vertical line response 444) and a peak in the consumer_sample_info_pages target variable (as shown for example by peak 446) represents the time delay of the effect that showing an advertisement has in drawing its viewers to the company's web site. In this example, it is determined that there is about a one day delay between an advertisement showing and its effect upon viewing the company's web pages. In all, there is about a six day effect upon the business metric target variable and the advertisement showing. After that, there is a drop until the next showing of an advertisement. Such analysis helps optimize business goals, such as how often to show an advertisement to have the desired effect.

With reference back to FIG. 15, the module 44 may also evaluate and specify in a campaign threshold analysis report 360 how the input variable business metrics can be adjusted to achieve a desired level change in a target campaign-related business metric. The module 44 fits nonlinear econometric model 152 to the target and non-target actual data 42.

After the nonlinear econometric model 152 is fit to the actual data 42, the module 44 generates the campaign threshold analysis report 360. The campaign threshold analysis report 360 shows at what new levels 362 non-target metrics should be in order to achieve a desired level change in a target metric.

Figure 19:
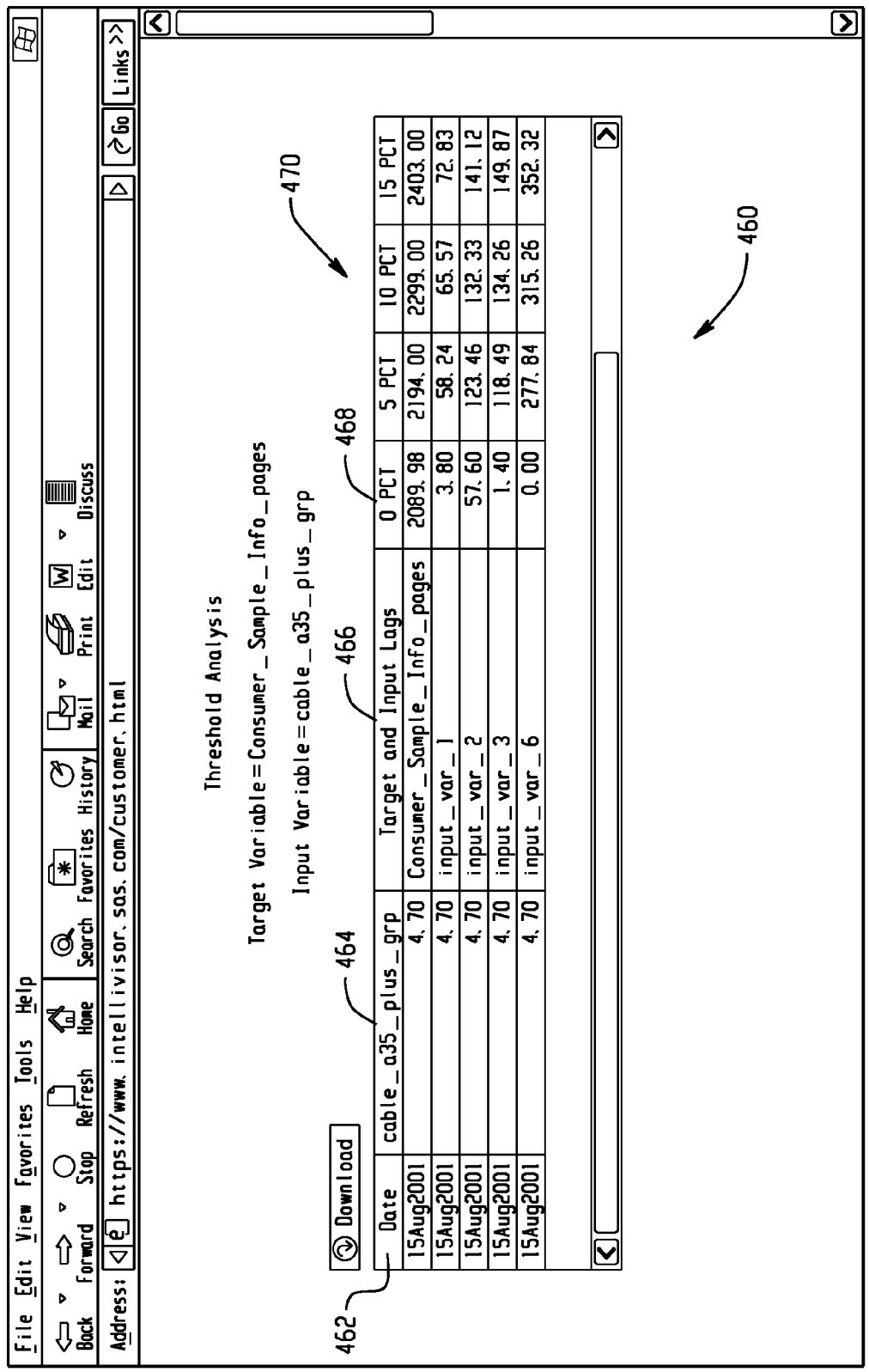
FIG. 19 is a graphical user interface depicting an exemplary campaign threshold analysis report.

FIG. 19 depicts an exemplary campaign threshold analysis report 460. To generate the report 460, nonlinear econometric model is initially fit to the cable_a35_plus_grp and consumer_sample_info_pages data. With an R square value of 0.81, the model provides a good measure of predictability.

An analyst can use the model to predict and extrapolate consumer_sample_info_pages with different data. FIG. 19 shows generation of predictions for a day in the future, such as dates beyond August 15th. The cable_a35_plus_grp column 464 shows the exposure level for the subject day August 15th 462. The variable names are provided under the column Target and Input Lags 466; consumer_sample_info_pages is the target variable; input_var_1 represents the exposure level at lag level one; input_var_2 represents the exposure level at lag level two; input_var_ 3 represents the exposure level at lag level three; and input_var_ 6 represents the exposure level at lag level six.

The predicted levels of the variables for the subject day without varying any variable's level are shown under the column heading 0 PCT 468. The remaining column headings 470 indicate levels for lags of cable_a35_plus_grp that would support increases in the target consumer_sample_info ages.

The analysis predicted for the subject day that with the lag levels remaining constant there would be approximately 2089.98 viewings of consumer_sample_info_pages. This was achieved with an exposure over multiple days. On the current subject day, there was an exposure rating level of 4.7 and then one day back was 3.8, and then two days back it was 57 and three days back it was 1.4 and six days back it was 0.00.

An analyst can then examine what realistic ways exist to increase the level of the target variable. For a 5% increase in the level of the target variable, the 5 PCT column shows what exposure ratings are needed. For example, the exposure level for a lag one would have to increase from 3.8 to 58 (with the assumption that all other levels are held constant). Such an increase may be possible while to achieve a 5% increase by changing the lag six exposure level from 0.0 to 277.84 may be impractical and thus no additional resources should be expended to increase the exposure level.

While examples have been used to disclose the invention, including the best mode, and also to enable any person skilled in the art to make and use the invention, the patentable scope of the invention is defined by the claims, and may include other examples that occur to those skilled in the art. For example, the business metric analysis techniques described herein may be used in many different contexts, such as to modify a web site to better meet business goals.

Figure 20:
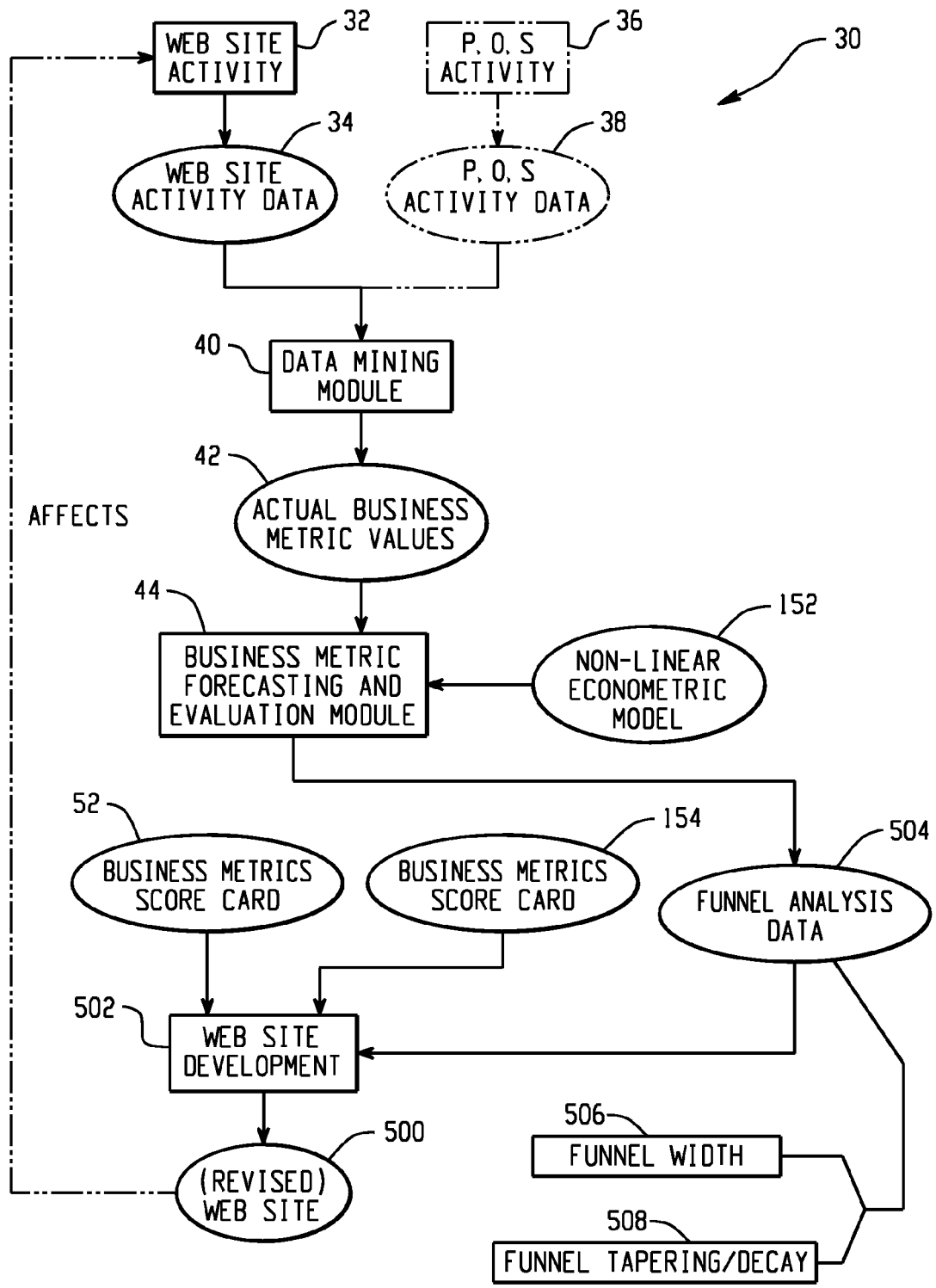
FIG. 20 is a block diagram depicting software and computer components utilized in performing funnel analysis.

FIG. 20 depicts the system 30 being used to modify a web site 500. The business metrics score card 52 and goal seeking score card 154 provide insight into what areas of the web site need improvement. The web site may be modified via development process 502 in order to improve the business metrics with low scores as well as those metrics whose improvement will effectively increase target levels.

Figure 21:
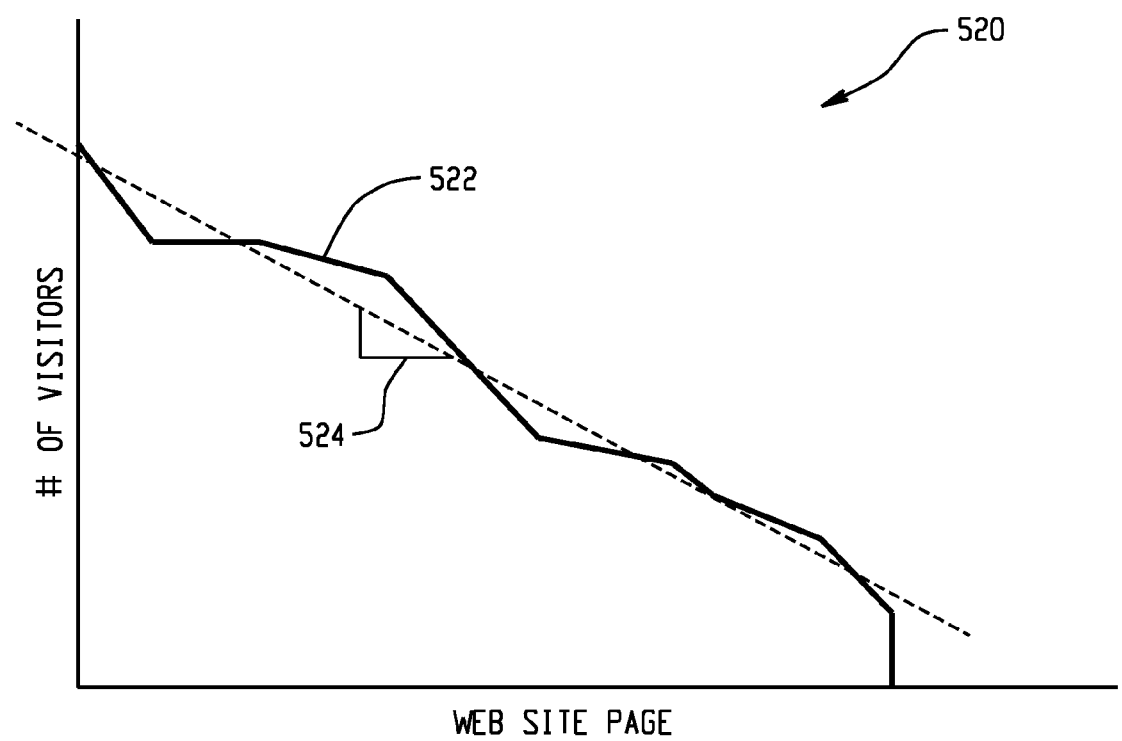
FIG. 21 is an x-y graph illustrating an exemplary funnel width and decay analysis plot.

The web site 500 may be further improved through web site funnel analysis. The module 44 may generate funnel analysis data 504 to discern how visitors traverse the company's web site 500. Based upon visitor traversal patterns revealed in the funnel analysis data 504, the web site may be further modified. The funnel analysis data 504 may include funnel width 506 and decay data 508. Based upon the web site activity data 34, the funnel width 506 and decay data 508 may be calculated and displayed as shown in the plot of FIG. 21. The plot 520 graphs what visitors visited which web pages on the company web site. The plot's funnel width is defined as the area under the curve 522 and is indicative of the number of visitors on the company's web site. The plot's funnel decay is defined as the overall slope 524 of the funnel. The more negative the slope is the less visitors remained on the web site. The closer the slope is to zero, the more visitors remained on the web site. A favorable combination of the funnel width and decay characteristics for a web site would be relatively wide with a very small slope. This indicates that the web site has a good amount of traffic and visitors tend to remain. Through the funnel width and decay characteristics, a web site developer can assess how people traverse the web site and gain insight into how to better interconnect the web pages and/or what content should be on the web site and where it should be located.

Figure 22:
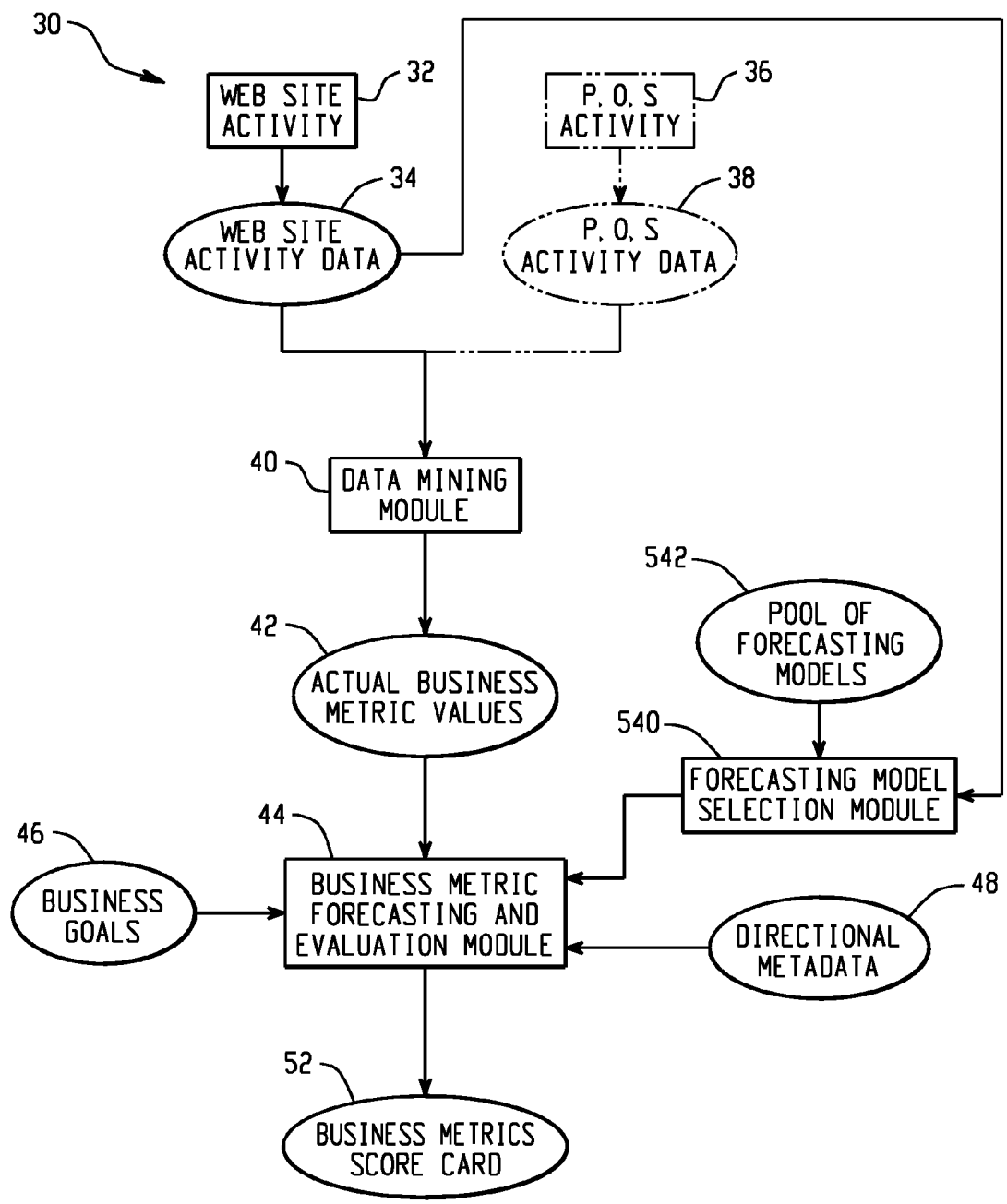
FIG. 22 is a block diagram depicting software and computer components utilized in generating business metrics score cards and other analyses through automated forecasting techniques.

As another example of the wide scope of the system, the system may include automated forecasting techniques to help with business metric forecasting and evaluation. FIG. 22 shows the system 30 wherein business metric score cards 52 (and other analyses) are generated in part through an automated forecasting module 540. As discussed above, a model is used by the system 30 to generate predicted values, such as predictions for target and non-target business metrics. The forecasting model selection module 540 automates the process of selecting the model. The forecasting model selection module 540 selects predictive models from a pool 542 of forecasting models based upon the web site activity data 34. The pool 542 of forecasting models may include such forecasting models as: Smoothing Models (Simple, Double, Linear, Damped Trend, Seasonal, Winters Method (additive and multiplicative)); transformed versions of these models may also be used (Log, Square Root, Logistic, Box-Cox); and for intermittent time series (series where a large number of values are zero-values), Croston's Method may be used. The details of how transactional data (e.g., web site, activity data) is utilized by the forecasting model selection module 540 are disclosed in the pending United States patent application document entitled "System And Method For Large-Scale Automatic Forecasting" filed on Mar. 29, 2002; having as a named inventor Michael Leonard (et al.) and owned by SAS Institute Inc.; and this document is incorporated herein by reference. It should be noted that the hold-out sample described in said document may comprise the actual day being analyzed by the system 30. It may also be the actual day being analyzed as well as one or more time periods before the actual day. It should be understood that not only can the forecasting model selection module 540 operate upon the web site activity data 34, but may operate upon any transactional data of the system 30 for which a predictive model is needed. Thus, the transactional data analyzed by the forecasting model selection module 540 can include P.O.S. activity data or campaign activity data.

It is claimed:

1. A computer-implemented method for evaluating an advertising campaign event, comprising:

executing software instructions on a computer processor to receive a selection of a business metric;

executing software instructions on the computer processor to receive data indicative of customer activity occurring after the advertising campaign event, wherein the customer activity data is actual point of sale or Internet-based customer activity data associated with the selected business metric, and wherein the advertising campaign event involves promotion of a product or service over a communication medium;

executing software instructions on the computer processor to receive promotion exposure data for the advertising campaign event;

executing software instructions on the computer processor to fit a statistical model to the customer activity data and to the promotion exposure data for the advertising campaign event;

executing software instructions on the computer processor to use the fitted statistical model to forecast values of the selected business metric, wherein forecasting is computed from the fitted statistical model, standard errors for the forecast estimates, and corresponding prediction intervals including predictions at different time lags and at a plurality of different desired levels, wherein a time lag is a lag in time between the advertising campaign event and the customer activity;

executing software instructions on the computer processor to generate a goal seeking report that displays the forecasted selected business metric values at the different time lags and at the plurality of different desired levels, the forecasted selected business metric values representing different desired goals for the selected business metric;

executing software instructions on the computer processor to generate a directional indicator based upon the forecasted selected business metric value and metric directional data, wherein the metric directional data is a determination of whether a business metric value is changing in a desired positive or negative direction; and executing software instructions on the computer processor to calculate an individual score for the selected business metric;

wherein when it is preferred that actual selected business metric values are greater than the forecasted selected business metric values, the individual score is calculated using the following:

$$\left(1/\sqrt{2\pi}\int_{-\infty}^{x}e^{-t^2/2}\,dt/2+.5\right)*100 \text{ where } x=\left((Y-\hat{Y})s_{\hat{Y}}\right),$$

and
alternatively, when it is preferred that actual selected business metric values are less than the forecasted selected business metric values, the individual score is calculated using the following:

$$\left(1 - \left(1/\sqrt{2\pi} \int_{-\infty}^{x} e^{-t^2/2} \, dt/2\right)\right) * 100 \text{ where } x = ((Y - \hat{Y})s_{\hat{Y}}),$$

and
wherein the individual score and the directional indicator are used to generate a business metrics report that shows performance of the selected business metric.

2. The method of claim 1, further comprising:
executing software instructions on the computer processor to calculate metadata associated with each business metric type as a function of time and the standardized difference between actual selected business metric values and the forecasted selected business metric values.

3. The method of claim 2, further comprising:
executing software instructions on the computer processor to calculate an upper and a lower confidence limit associated with the forecast for the selected business metric; and
executing software instructions on the computer processor to determine whether the forecasted selected business metric values fall between the upper and lower confidence limits.

4. The method of claim 1, further comprising:
executing software instructions on the computer processor to generate a forecast using a large-scale automatic forecasting module.

5. The method of claim 1, wherein calculating an individual score for the selected business metric is done as a function of actual selected business metric values, the forecasted selected business metric values, and the metadata.

6. The method of claim 1, wherein the generated business metric report indicates actual selected business metric values and the individual score.

7. The method of claim 6, wherein the business metric report indicates whether the selected business metric value is changing in the desired positive or negative direction.

8. The method of claim 7, further comprising:
executing software instructions on the computer processor to calculate a standardized difference as a function of the deviation between actual selected business metric values and the forecasted selected business metric values, wherein the business metric report also indicates the standardized difference for the selected business metric.

9. The method of claim 7, further comprising:
executing software instructions on the computer processor to calculate an upper and a lower confidence limit associated with the forecast for the selected business metric; and
executing software instructions on the computer processor to determine whether the forecasted selected business metric values fall between the upper and lower confidence limits, wherein the business metric report also indicates whether actual selected business metric value falls within the associated upper and lower confidence limits.

10. The method of claim 1, wherein the customer activity is logged from a plurality of data sources, wherein at least one of the data sources is a web site.

11. The method of claim 10, wherein at least one of the data sources is a point-of-sale device.

12. The method of claim 1, further comprising:
executing software instructions on the computer processor to calculate a standardized difference as a function of the deviation between actual selected business metric values and the forecasted selected business metric values.

13. The method of claim 1, further comprising:
executing software instructions on the computer processor to calculate an amount by which actual selected business metric values must change in order to achieve a preferred value; and
executing software instructions on the computer processor to generate a goal seeking report that indicates the amount by which actual selected business metric values may change.

14. The method of claim 13, wherein the amount by which actual selected business metric values may change is calculated using a nonlinear econometric model.

15. The method of claim 1, wherein a point of sale customer activity is a customer visit to a store, a customer viewing a product at a store, or a customer purchase at a store.

16. The method of claim 1, wherein an Internet-based customer activity is a customer visit to a website, a customer viewing a product page on a website, or a customer purchase at a website.

17. The method of claim 1, wherein a communication medium is a medium selected from the group consisting of radio, television, newsprint, magazines, Internet, films, books, video games, CDs, and DVDs.

18. The method of claim 1, wherein the goal seeking report is generated by individually solving for values of the selected business metric at different target values, and
wherein the goal seeking report facilitates access to one or more graphical evaluations of the selected business metric.

19. The method of claim 1, wherein the different desired goals for the selected business metric represent ways to increase the level of the target variable by determining an exposure rating.

20. A computer-implemented system for evaluating an advertising campaign event, comprising:
a data processor; and
a memory storing the following:
software instructions executable on the data processor to receive a selection of a business metric;
software instructions executable on the data processor to receive data indicative of customer activity occurring after the advertising campaign event, wherein the customer activity data is actual point of sale or Internet-based activity data associated with the selected business metric, and wherein the advertising campaign event involves promotion of a product or service over a communication medium;
software instructions executable on the data processor to receive promotion exposure data for the advertising campaign event;
software instructions executable on the data processor to fit a statistical model to the customer activity data and to the promotion exposure data for the advertising campaign event;
software instructions executable on the data processor to use the fitted statistical model to forecast values of the selected business metric, wherein the forecasting is computed from the fitted statistical model, standard errors for the forecast estimates, and corresponding prediction intervals including predictions at different time lags and at a plurality of different desired levels, wherein a time lag is a lag in time between the advertising campaign event and the customer activity;

software instructions executable on the data processor to generate a goal seeking report that displays forecasted selected business metric values at the different time lags and at the plurality of different desired levels, the forecasted selected business metric values representing different desired goals for the selected business metric;

software instructions executable on the data processor to generate a directional indicator based upon the forecasted selected business metric value and metric directional data, wherein the metric directional data is a determination of whether a business metric value is changing in a desired positive or negative direction; and software instructions executable on the data processor to calculate an individual score for the selected business metric;

wherein when it is preferred that actual selected business metric values are greater than the forecasted selected business metric values, the individual score is calculated using the following:

$$\left(1/\sqrt{2\pi} \int_{-\infty}^{x} e^{-t^2/2}\, dt/2 + .5\right) * 100 \text{ where } x = ((Y - \hat{Y})s_{\hat{Y}}),$$

and alternatively, when it is preferred that actual selected business metric values are less than the forecasted selected business metric values, the individual score is calculated using the following:

$$\left(1 - \left(1/\sqrt{2\pi} \int_{-\infty}^{x} e^{-t^2/2}\, dt/2\right)\right) * 100 \text{ where } x = ((Y - \hat{Y})s_{\hat{Y}}),$$

and wherein the individual score and the directional indicator are used to generate a business metrics report that shows performance of the selected business metric.

* * * * *

UNITED STATES PATENT AND TRADEMARK OFFICE
CERTIFICATE OF CORRECTION

PATENT NO.       : 7,634,423 B2                                               Page 1 of 1
APPLICATION NO.  : 10/232153
DATED            : December 15, 2009
INVENTOR(S)      : Brocklebank It is certified that error appears in the above-identified patent and that said Letters Patent is hereby corrected as shown below:

In column 13, line 7, delete " $(1- (1/\sqrt{2\pi} \int_{-\infty}^{x} e^{-t^2/2} \, dt/2))*100$ where $x = ((Y - \hat{Y})s_{\hat{Y}})$, " and insert -- $(1- (1/\sqrt{2\pi} \int_{-\infty}^{x} e^{-t^2/2} \, dt/2))*100$ where $x = ((Y - \hat{Y})/s_{\hat{Y}})$, --.

In column 13, line 62, delete "value" and insert -- values --.

In column 16, line 5, delete " $(1- (1/\sqrt{2\pi} \int_{-\infty}^{x} e^{-t^2/2} \, dt/2))*100$ where $x = ((Y - \hat{Y})s_{\hat{Y}})$, " and insert -- $(1- (1/\sqrt{2\pi} \int_{-\infty}^{x} e^{-t^2/2} \, dt/2))*100$ where $x = ((Y - \hat{Y})/s_{\hat{Y}})$, --.

In column 16, line 16, delete " $(1- (1/\sqrt{2\pi} \int_{-\infty}^{x} e^{-t^2/2} \, dt/2))*100$ where $x = ((Y - \hat{Y})s_{\hat{Y}})$, " and insert -- $(1- (1/\sqrt{2\pi} \int_{-\infty}^{x} e^{-t^2/2} \, dt/2))*100$ where $x = ((Y - \hat{Y})/s_{\hat{Y}})$, --.

Signed and Sealed this

Twentieth Day of April, 2010

David J. Kappos
*Director of the United States Patent and Trademark Office*